US010833737B2

(12) United States Patent
Park

(10) Patent No.: US 10,833,737 B2
(45) Date of Patent: Nov. 10, 2020

(54) METHOD AND APPARATUS FOR CONTROLLING MULTI-ANTENNA OF VEHICLE IN AUTONOMOUS DRIVING SYSTEM

(71) Applicant: LG Electronics Inc., Seoul (KR)

(72) Inventor: Yong Soo Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/713,616

(22) Filed: Dec. 13, 2019

(65) Prior Publication Data
US 2020/0119775 A1 Apr. 16, 2020

(30) Foreign Application Priority Data

Aug. 15, 2019 (KR) .................. 10-2019-0099976

(51) Int. Cl.
H04B 7/0404 (2017.01)
H04W 4/40 (2018.01)
G08G 1/0967 (2006.01)
H04B 7/08 (2006.01)
H04B 17/318 (2015.01)

(52) U.S. Cl.
CPC ..... H04B 7/0404 (2013.01); G08G 1/096783 (2013.01); H04B 7/08 (2013.01); H04B 17/318 (2015.01); H04W 4/40 (2018.02)

(58) Field of Classification Search
None
See application file for complete search history.

(56) References Cited

U.S. PATENT DOCUMENTS

| 2016/0249198 A1* | 8/2016 | Kim | H04W 72/04 |
| 2017/0230996 A1* | 8/2017 | Li | H04W 72/1294 |
| 2017/0331577 A1* | 11/2017 | Parkvall | H04W 4/00 |
| 2018/0097637 A1* | 4/2018 | Weinfield | H04B 17/27 |
| 2018/0132208 A1* | 5/2018 | Pan | H04W 72/0406 |

(Continued)

FOREIGN PATENT DOCUMENTS

| KR | 1020140040658 | 4/2014 |
| KR | 1020180005485 | 1/2018 |
| KR | 1020190047204 | 5/2019 |

OTHER PUBLICATIONS

Korean Office Action in Korean Appln. No. 10-2019-0099976, dated Jul. 20, 2020, 14 pages (with English translation).

Primary Examiner — Lana N Le
(74) Attorney, Agent, or Firm — Fish & Richardson P.C.

(57) ABSTRACT

A method of controlling a multi-antenna of a reception terminal in an autonomous driving system (Automated Vehicle & Highway Systems) acquires directional information of the multi-antenna installed to receive a V2X message in the reception terminal, sets a danger expectation direction, receives the V2X message, determines a first transmission direction of the V2X message based on the directional information, and preferentially processes a V2X signal transmitted in the danger expectation direction through a preferential queue, thereby being able to prevent danger occurrence. One or more of an autonomous vehicle, a user terminal, and a server of the present disclosure may be associated with an artificial intelligence module, a drone ((Unmanned Aerial Vehicle, UAV), a robot, an AR (Augmented Reality) device, a VR (Virtual Reality) device, a device associated with 5G services, etc.

19 Claims, 20 Drawing Sheets

(56) References Cited

U.S. PATENT DOCUMENTS

| | | | |
|---|---|---|---|
| 2018/0146491 A1* | 5/2018 | Kim | H04W 28/0268 |
| 2018/0176891 A1* | 6/2018 | Kim | H04L 27/26 |
| 2019/0053133 A1* | 2/2019 | Abouelseoud | H04W 48/16 |
| 2019/0132709 A1* | 5/2019 | Graefe | G08G 1/0133 |
| 2019/0356677 A1* | 11/2019 | Naserian | G01S 5/0072 |
| 2019/0363779 A1* | 11/2019 | Chae | H04B 7/14 |
| 2019/0387379 A1* | 12/2019 | Sugiyama | H04L 5/0048 |
| 2020/0015272 A1* | 1/2020 | Lee | H04W 72/1278 |
| 2020/0029233 A1* | 1/2020 | Gallagher | G01C 21/3415 |
| 2020/0045516 A1* | 2/2020 | Lee | H04L 5/0048 |
| 2020/0053768 A1* | 2/2020 | Chen | H04W 72/1278 |
| 2020/0059915 A1* | 2/2020 | Lee | H04W 56/0015 |
| 2020/0100119 A1* | 3/2020 | Byun | H04B 7/088 |
| 2020/0120458 A1* | 4/2020 | Aldana | H04W 28/22 |
| 2020/0154511 A1* | 5/2020 | Pan | H04L 12/184 |

* cited by examiner

FIG. 10
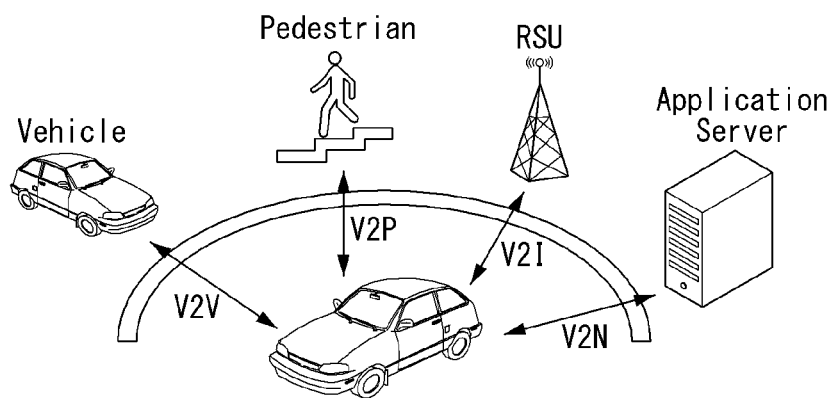
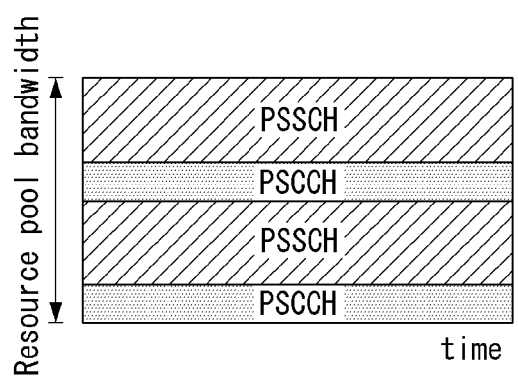
FIG. 11A
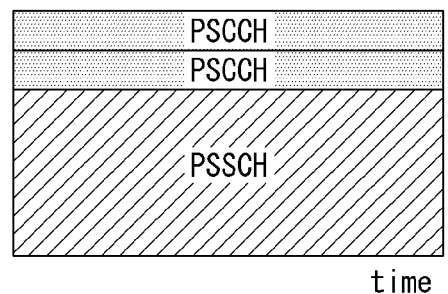
FIG. 11B

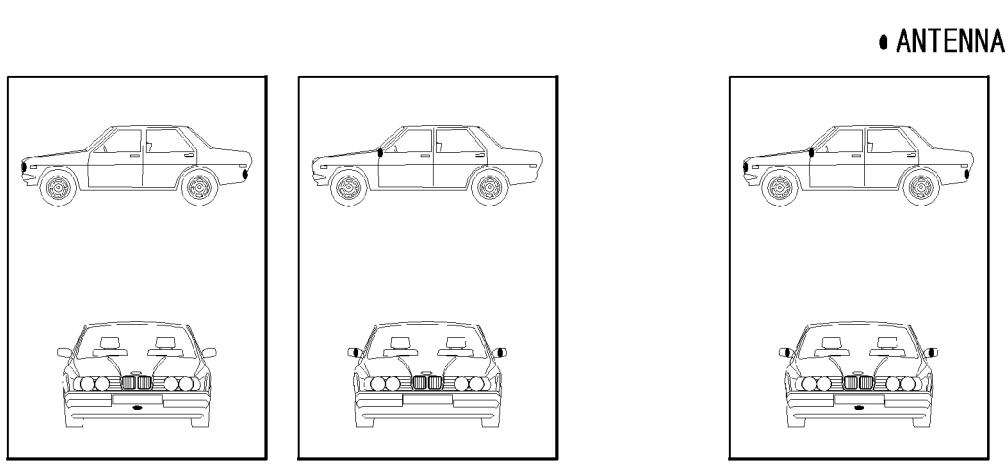
FIG. 13A
FIG. 13B
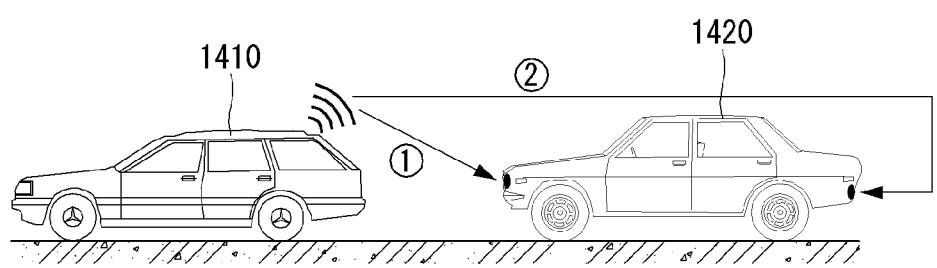
FIG. 14A
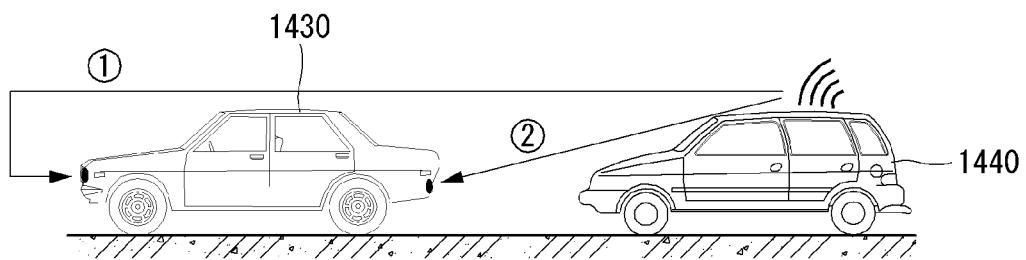
FIG. 14B

METHOD AND APPARATUS FOR CONTROLLING MULTI-ANTENNA OF VEHICLE IN AUTONOMOUS DRIVING SYSTEM

CROSS-REFERENCE TO RELATED APPLICATION

This application claims the benefit of Korean Patent Application No. 10-2019-0099976 filed on Aug. 15, 2019. The contents of this application are hereby incorporated by reference in its entirety.

BACKGROUND OF THE INVENTION

Field of the Invention

The present disclosure relates to an autonomous driving system, particularly, a method and apparatus for controlling a multi-antenna distributed in a vehicle.

Related Art

Vehicles may be classified into an internal combustion engine vehicle, an external composition engine vehicle, a gas turbine vehicle, an electric vehicle, etc. According to types of motors used therefor.

An autonomous vehicle refers to a self-driving vehicle that may travel without an operation of a driver or a passenger, and automated vehicle & highway systems refer to systems that monitor and control the autonomous vehicle such that the autonomous vehicle may perform self-driving.

SUMMARY OF THE INVENTION

An object of the present disclosure is to propose a method of efficiently controlling a multi-antenna of a vehicle.

Further, an object of the present disclosure is to propose a control method that can preferentially process a V2X message that is received in a danger expectation direction.

The technical subject to implement in the present disclosure is not limited to the technical problems described above and other technical subjects that are not stated herein will be clearly understood by those skilled in the art from the following specifications.

An aspect of the present disclosure provides a method of controlling a multi-antenna of a reception terminal in an autonomous driving system (Automated Vehicle & Highway Systems), the method including: acquiring directional information of the multi-antenna installed to receive a V2X message in the reception terminal; setting a danger expectation direction indicating the direction in which an object, which requires attention, is positioned, through first sensing information or map information; receiving the V2X message and determining a first transmission direction of the V2X message on the basis of the directional information; en-queuing the V2X message to a queue mapped to the first transmission direction; and de-queuing the V2X message on the basis of a preference value set in the queue, in which the multi-antenna may include a first antenna and a second antenna directed in a direction symmetric to the first antenna, the first transmission direction may be determined on the basis of a signal intensity difference value of the V2X message received at the first antenna and the second antenna, and the preference value may be based on the danger expectation direction.

The method may further include: performing a control operation on the basis of the V2X message; resetting the danger expectation direction through second sensing information or the map information; and resetting the preference value on the basis of the reset danger expectation direction, in which the control operation may be based on a distance between the object and the reception terminal.

The method may further include: determining a second transmission direction of the V2X message on the basis of the directional information; and updating the first transmission direction on the basis of the second transmission direction, in which the determining of the second transmission direction may be performed at every specific period and may be based don the signal intensity difference value, and the updating of the first transmission direction may be performed when the transmission direction exceeds an allowable range of the first transmission direction.

4The V2X message may include a source Layer-2 ID, and the first transmission direction may be determined for each source Layer-2 ID.

Further, the first antenna may be positioned on a front surface of the reception terminal and the second antenna may be positioned on a rear surface of the reception terminal.

Further, the first transmission direction may include values that indicate a front direction, a rear direction, or that a direction cannot be specified with respect to the reception terminal.

Further, the multi-antenna may include a third antenna positioned on a left side of the reception terminal and a fourth antenna positioned on a right side of the reception terminal.

Further, the first transmission direction may include values that indicate a front direction, a rear direction, a left direction, a right direction, a front left direction, a front right direction, a rear left direction, a rear right direction, or that a direction cannot be specified with respect to the reception terminal.

Further, when the signal intensity difference value does not exceed a predetermined range, the value indicating that a direction cannot be specified may be determined as the first transmission direction.

Further, the method may further include, when receiving location information of an RSU (Road side unit) transmitting a traffic light signal, setting the danger expectation direction on the basis of the location information, in which the location information may be acquired using the map information.

Another aspect of the present disclosure provides a reception terminal for a method of controlling a multi-antenna in an autonomous driving system (Automated Vehicle & Highway Systems), the reception terminal includes: a sensing unit; a communication module, a reception (Rx) processor; and a processor, in which the processor may: acquire directional information of the multi-antenna installed to receive a V2X message in the reception terminal; set a danger expectation direction indicating the direction in which an object, which requires attention, is positioned, through first sensing information or map information; receive the V2X message and determines a first transmission direction of the V2X message on the basis of the directional information; en-queue the V2X message to a queue mapped to the first transmission direction; and de-queue the V2X message on the basis of a preference value set in the queue, in which the multi-antenna may include a first antenna and a second antenna directed in a direction symmetric to the first antenna, the first transmission direction may be determined on the basis of a signal intensity difference value of the V2X message received at the first antenna and the second antenna, and the preference value may be based on the danger expectation direction.

BRIEF DESCRIPTION OF THE DRAWINGS

FIG. 10 is an example of V2X communication to which the present disclosure can be applied.

FIGS. 11A and 11B exemplifies a resource allocation method in a sidelink in which V2X is used.

FIGS. 13A and 13B is an example of an antenna position that can be applied in the present disclosure.

FIGS. 14A and 14B is an example of direction determination in accordance with an antenna signal that can be applied in the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
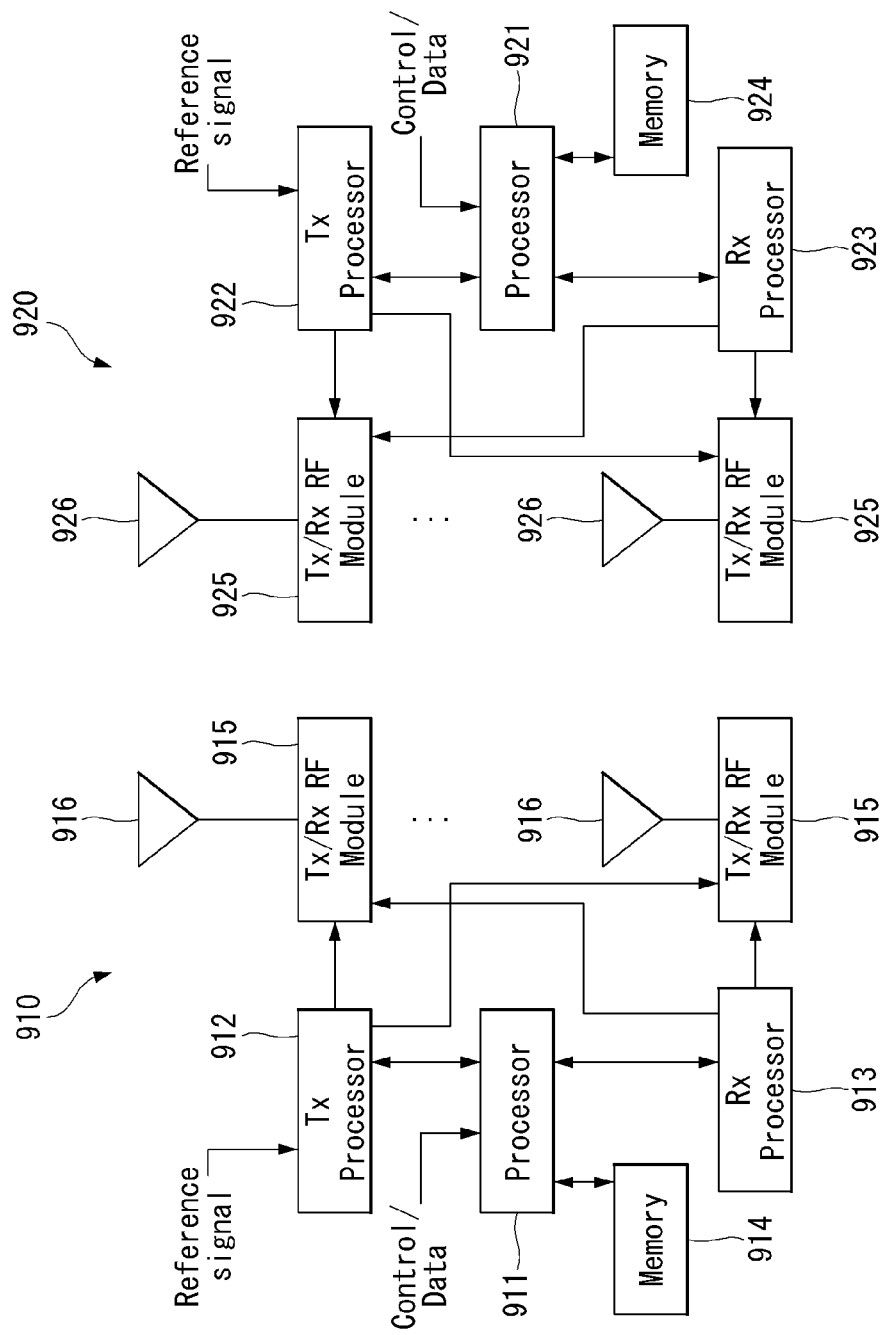
FIG. 1 is a block diagram of a wireless communication system to which the methods proposed herein may be applied.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 may perform detailed autonomous operations.

A 5G network including another vehicle communicating with the autonomous device is defined as a second communication device (920 of FIG. 1), and a processor 921 may perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

Signal Transmission/Reception Method in Wireless Communication System

Figure 2:
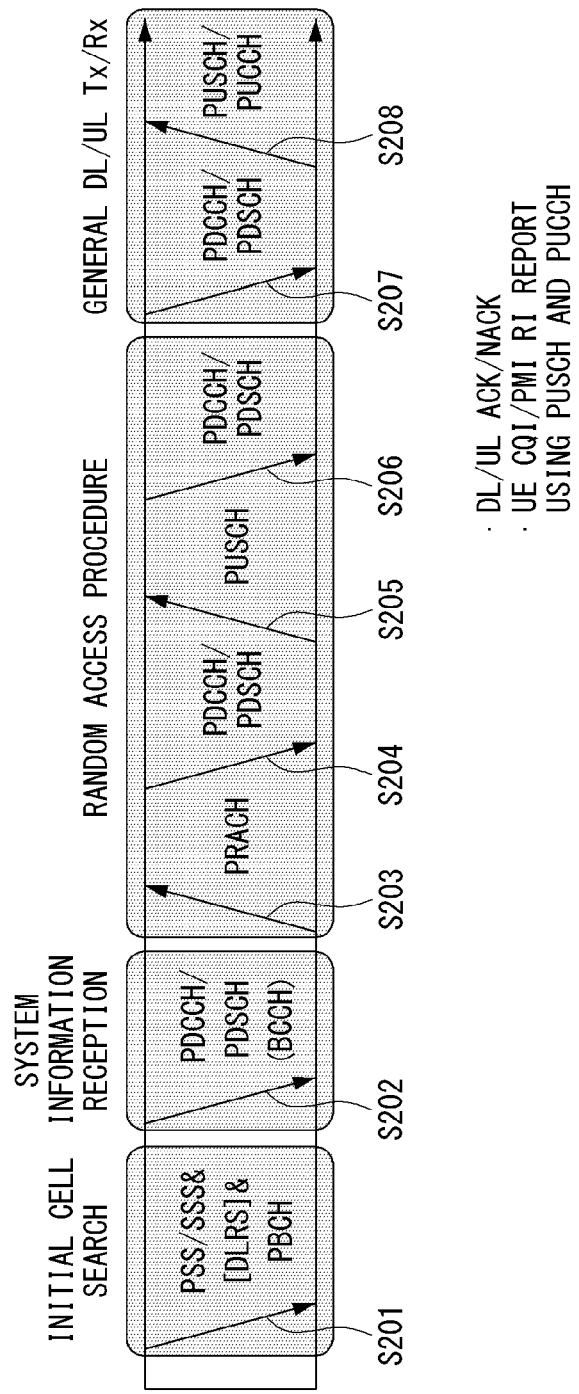
FIG. 2 shows an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE may receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE may perform a random access procedure (RACH) for the BS (steps S203 to S206). To this end, the UE may transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE may perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network may configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH may be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE may perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure may be used for network initial access, handover, and UE-triggered UL data transmission. A UE may acquire UL synchronization and UL transmission resources through the random access procedure. The random access procedure is classified into a contention-based random access procedure and a contention-free random access procedure. A detailed procedure for the contention-based random access procedure is as follows.

A UE may transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE may receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE may be determined according to presence or absence of a random access preamble ID with respect to the preamble transmitted by the UE. If there is no response to Msg1, the UE may retransmit the RACH preamble less than a predetermined number of times while performing power ramping. The UE calculates PRACH transmission power for preamble retransmission on the basis of most recent pathloss and a power ramping counter.

The UE may perform UL transmission through Msg3 of the random access procedure over a physical uplink shared channel on the basis of the random access response information. Msg3 may include an RRC connection request and a UE ID. The network may transmit Msg4 as a response to Msg3, and Msg4 may be handled as a contention resolution message on DL. The UE may enter an RRC connected state by receiving Msg4.

Beam Management (BM) Procedure of 5G Communication System

A BM procedure may be divided into (1) a DL MB procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set may be set as {SSBx1, SSBx2, SSBx3, SSBx4, . . . }. An SSB index may be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam may be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE may skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and may be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information may be transmitted/received through a narrowband (e.g., 6 resource blocks (RBs) or 1 RB).

Basic Operation Between Autonomous Vehicles Using 5G Communication

Figure 3:
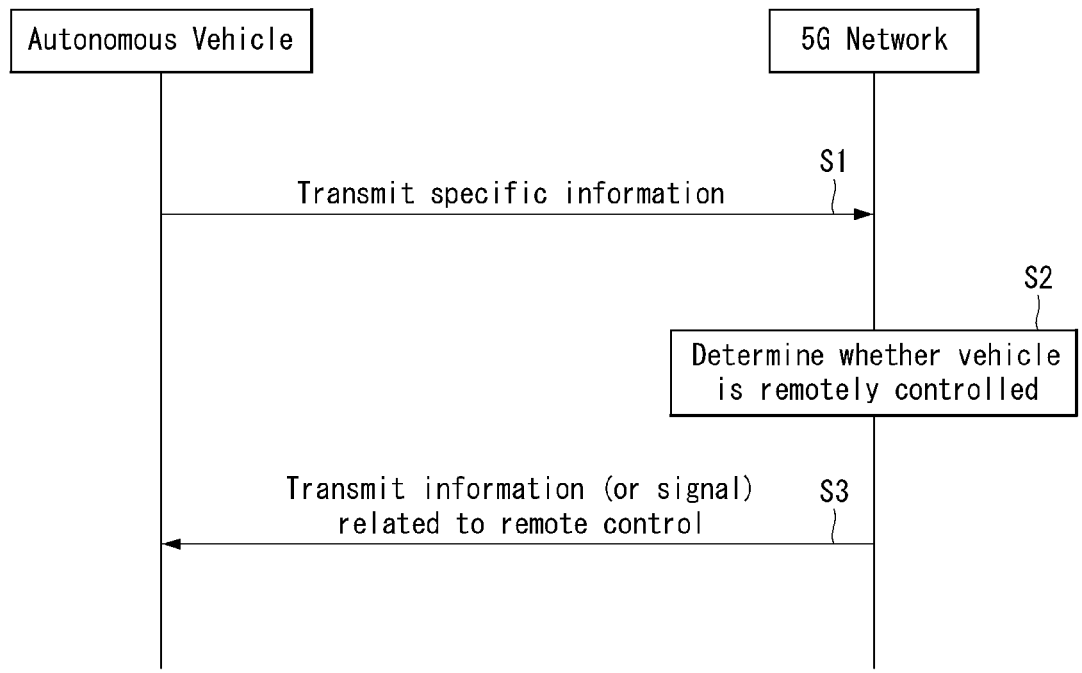
FIG. 3 illustrates an example of a basic operation of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network may determine whether to remotely control the vehicle (S2). Here, the 5G network may include a server or a module which performs remote control related to autonomous driving. In addition, the 5G network may transmit information (or signal) related to remote control to the autonomous vehicle (S3).

Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network may transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network may transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle may receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle may receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information may be transmitted through a narrowband of 6 resource blocks (RBs) or 1 RB.

Autonomous Driving Operation Between Vehicles Using 5G Communication

Figure 4:
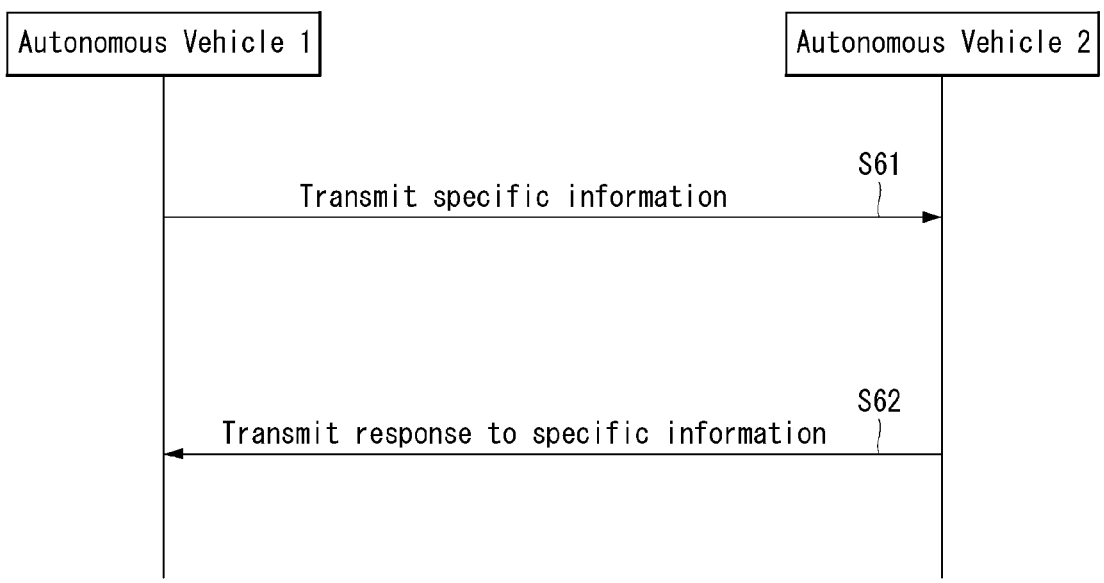
FIG. 4 shows an example of a basic operation between a vehicle and a vehicle using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network may transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology may be combined with methods proposed in the present disclosure which will be described later and applied or may complement the methods proposed in the present disclosure to make technical features of the methods concrete and clear.

Driving (1) Exterior of Vehicle

Figure 5:
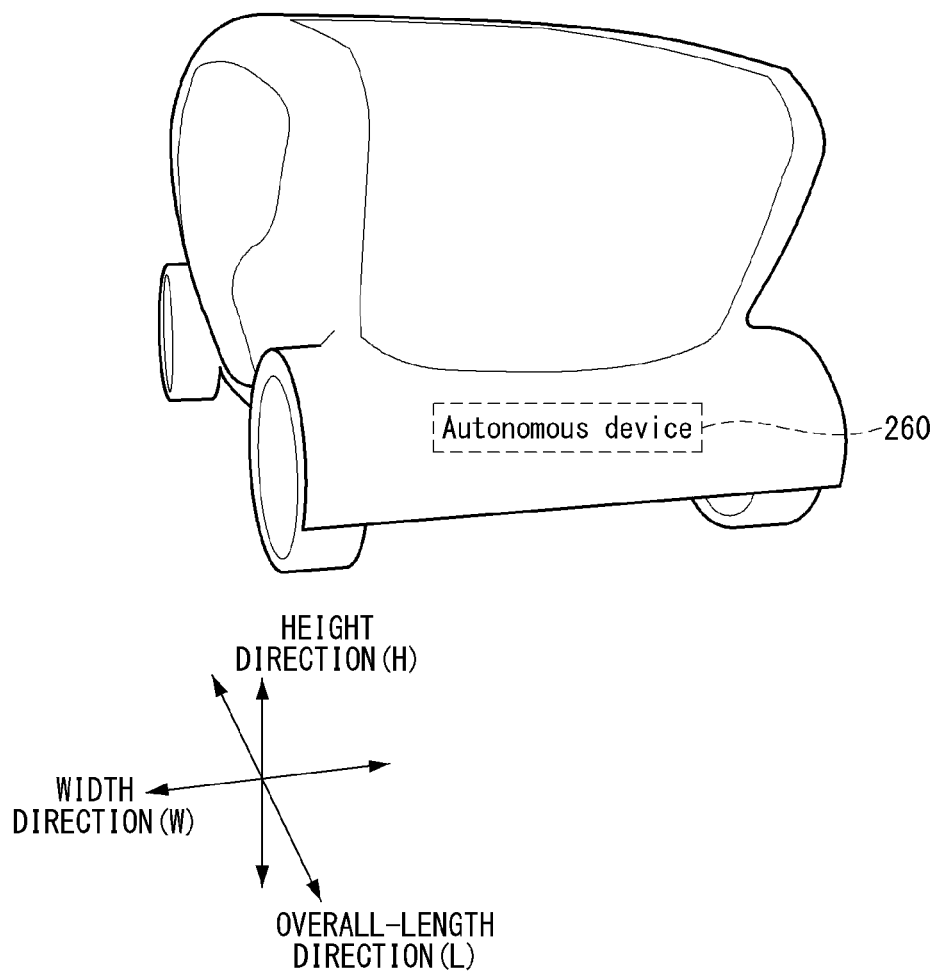
FIG. 5 is a diagram illustrating a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
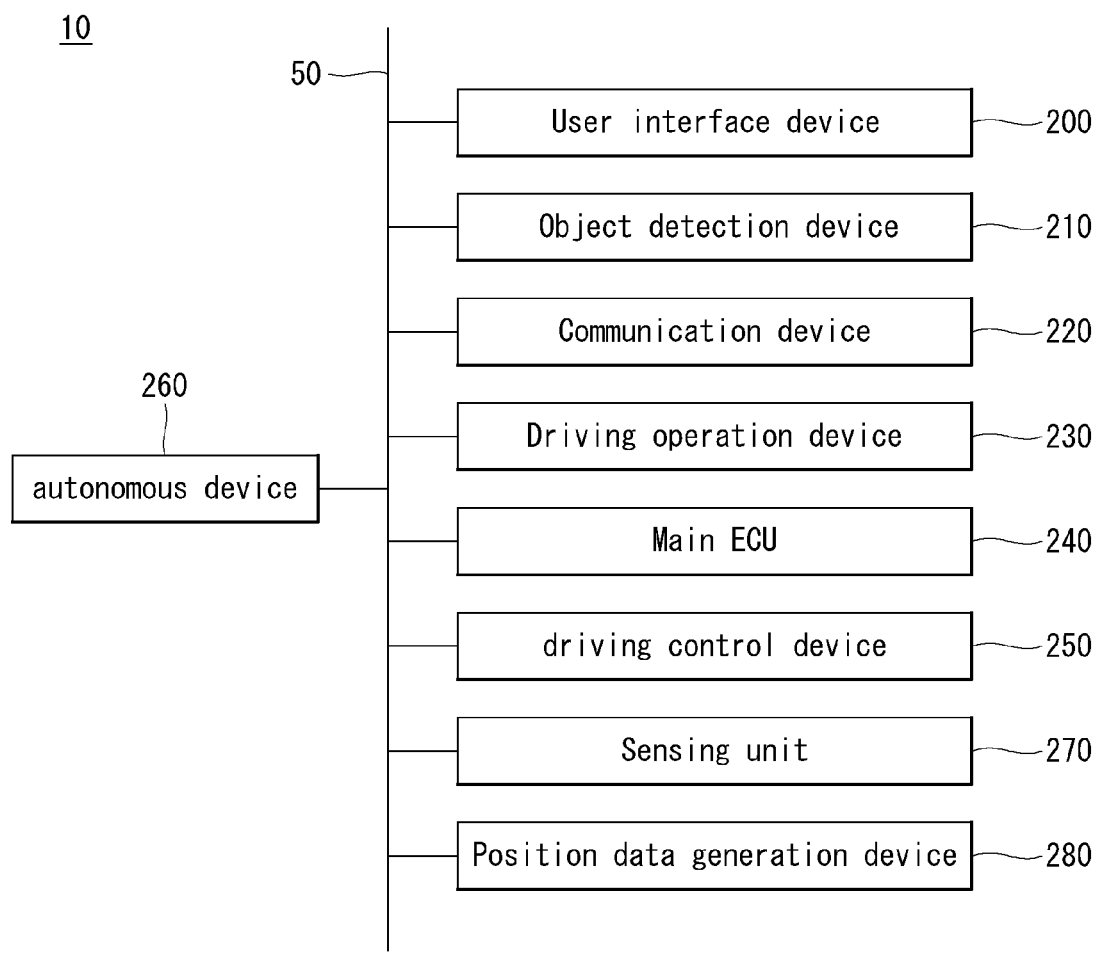
FIG. 6 is a control block diagram of a vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 may receive user input and provide information generated in the vehicle 10 to the user. The vehicle 10 may realize a user interface (UI) or user experience (UX) through the user interface device 200. The user interface device 200 may include an input device, an output device and a user monitoring device.

2) Object Detection Device

The object detection device 210 may generate information about objects outside the vehicle 10. Information about an object may include at least one of information on presence or absence of the object, positional information of the object, information on a distance between the vehicle 10 and the object, and information on a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor and an infrared sensor. The object detection device 210 may provide data about an object generated on the basis of a sensing signal generated from a sensor to at least one electronic device included in the vehicle.

2.1) Camera

The camera may generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera may acquire positional information of objects, information on distances to objects, or information on relative speeds with respect to objects using various image processing algorithms. For example, the camera may acquire information on a distance to an object and information on a relative speed with respect to the object from an obtained image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image obtained from a stereo camera on the basis of disparity information.

The camera may be attached at a portion of the vehicle at which FOV (field of view) may be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar may generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar may detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar may generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar may detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle and a terminal. The communication device 220 may include a transmission antenna, a reception antenna, and at least one of a radio frequency (RF) circuit and an RF element which may implement various communication protocols in order to perform communication.

For example, the communication device may exchange signals with external devices on the basis of C-V2X (Cellular V2X). For example, C-V2X may include sidelink communication on the basis of LTE and/or sidelink communication on the basis of NR. Details related to C-V2X will be described later.

For example, the communication device may exchange signals with external devices on the basis of DSRC (Dedicated Short Range Communications) or WAVE (Wireless Access in Vehicular Environment) standards on the basis of IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure may exchange signals with external devices using only one of C-V2X and DSRC. Alternatively, the communication device of the present disclosure may exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 may control vehicle driving devices on the basis of signals received by the autonomous device 260. For example, the driving control device 250 may control a power train, a steering device and a brake device on the basis of signals received by the autonomous device 260.

7) Autonomous Device

The autonomous device 260 may generate a route for self-driving on the basis of obtained data. The autonomous device 260 may generate a driving plan for traveling along the generated route. The autonomous device 260 may generate a signal for controlling movement of the vehicle according to the driving plan. The autonomous device 260 may provide the signal to the driving control device 250.

The autonomous device 260 may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 may perform switching from a self-driving mode to a manual driving mode or switching from the manual driving mode to the self-driving mode. For example, the autonomous device 260 may switch the mode of the vehicle 10 from the self-driving mode to the manual driving mode or from the manual driving mode to the self-driving mode on the basis of a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 may generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 may generate position data of the vehicle 10. The position data generation device 280 may include at least one of a global positioning system (GPS) and a differential global positioning system (DGPS). The position data generation device 280 may generate position data of the vehicle 10 on the basis of a signal generated from at least one of the GPS and the DGPS. According to an embodiment, the position data generation device 280 may correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Device

Figure 7:
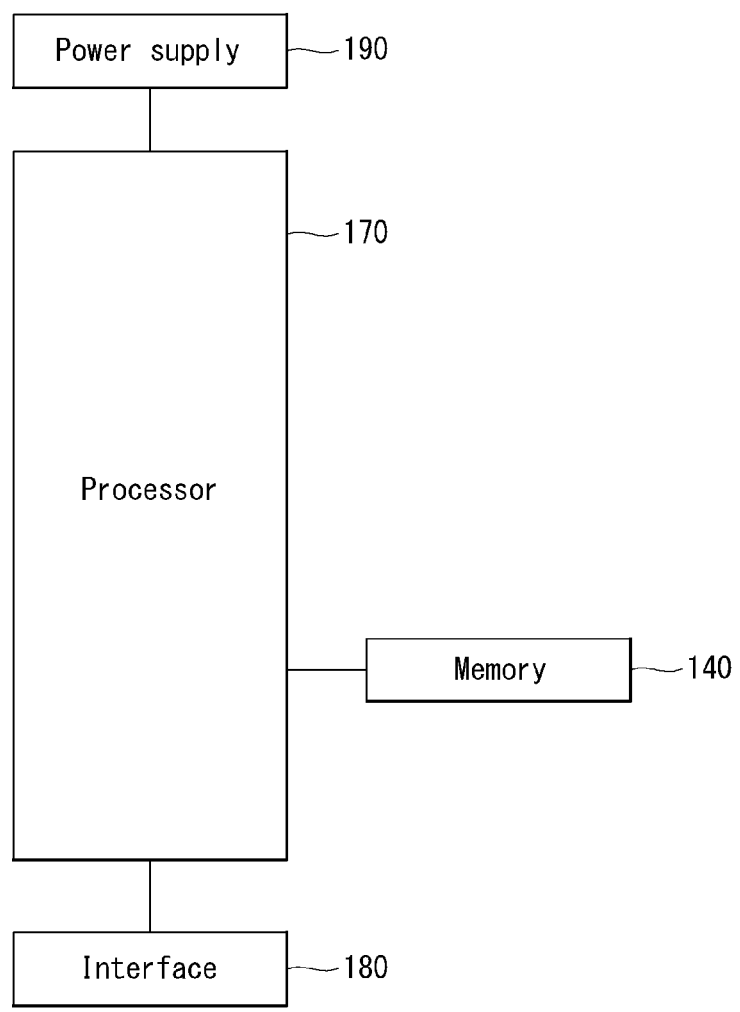
FIG. 7 is a control block diagram of an autonomous vehicle according to an embodiment of the present disclosure.

FIG. 7 is a control block diagram of the autonomous device according to an embodiment of the present disclosure.

Referring to FIG. 7, the autonomous device 260 may include a memory 140, a processor 170, an interface 180 and a power supply 190.

The memory 140 is electrically connected to the processor 170. The memory 140 may store basic data with respect to units, control data for operation control of units, and input/output data. The memory 140 may store data processed in the processor 170. Hardware-wise, the memory 140 may be configured as at least one of a ROM, a RAM, an EPROM, a flash drive and a hard drive. The memory 140 may store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 in a wired or wireless manner. The interface 180 may exchange signals with at least one of the object detection device 210, the communication device 220, the driving operation device 230, the main ECU 240, the driving control device 250, the sensing unit 270 and the position data generation device 280 in a wired or wireless manner. The interface 180 may be configured using at least one of a communication module, a terminal, a pin, a cable, a port, a circuit, an element and a device.

The power supply 190 may provide power to the autonomous device 260. The power supply 190 may be provided with power from a power source (e.g., a battery) included in the vehicle 10 and supply the power to each unit of the autonomous device 260. The power supply 190 may operate according to a control signal supplied from the main ECU 240. The power supply 190 may include a switched-mode power supply (SMPS).

The processor 170 may be electrically connected to the memory 140, the interface 180 and the power supply 190 and exchange signals with these components. The processor 170 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be operated by power supplied from the power supply 190. The processor 170 may receive data, process the data, generate a signal and provide the signal while power is supplied thereto.

The processor 170 may receive information from other electronic devices included in the vehicle 10 through the interface 180. The processor 170 may provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 8:
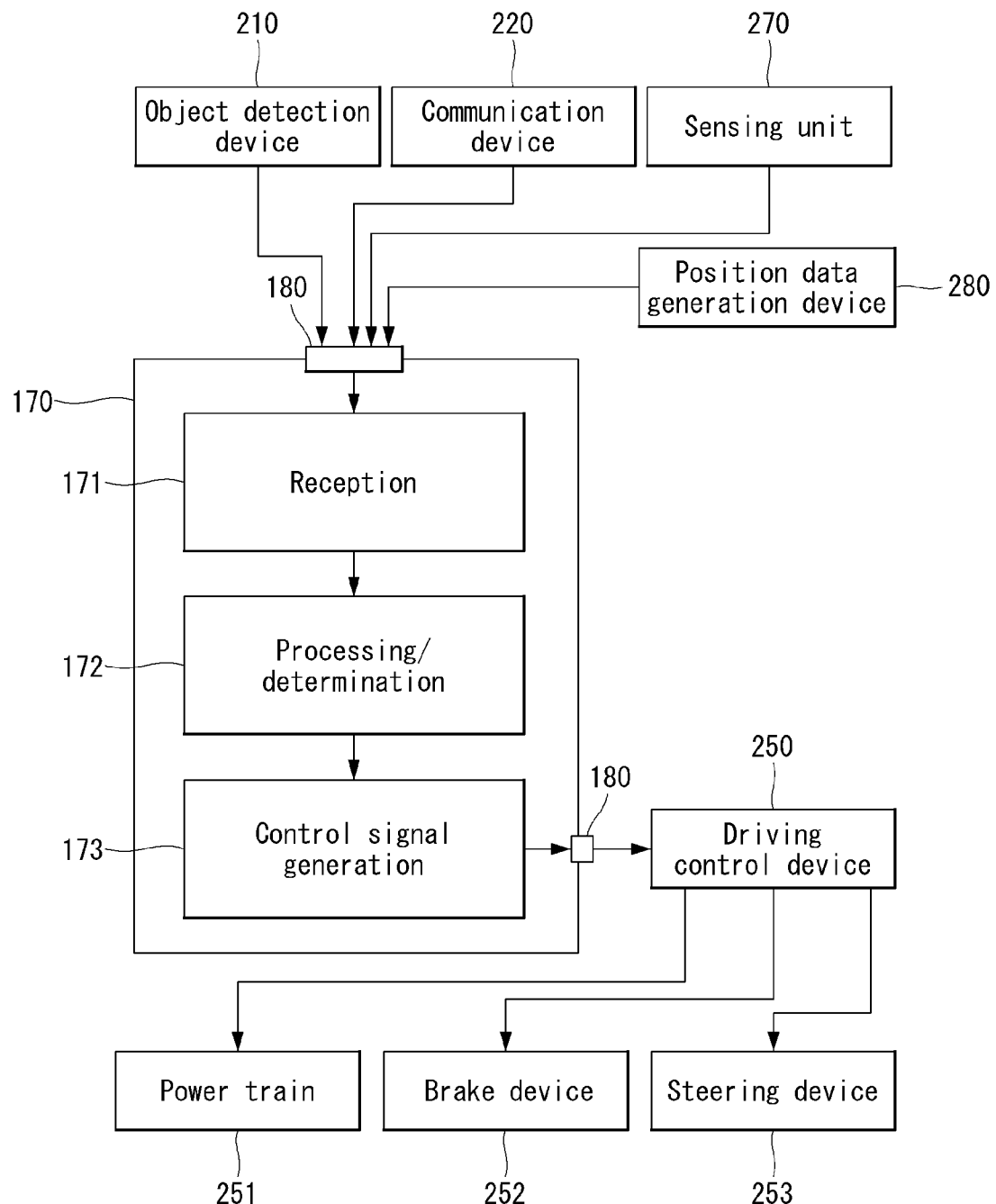
FIG. 8 is a signal flowchart of an autonomous vehicle according to an embodiment of the present disclosure.

FIG. 8 is a diagram showing a signal flow in an autonomous vehicle according to an embodiment of the present disclosure.

1) Reception Operation

Referring to FIG. 8, the processor 170 may perform a reception operation. The processor 170 may receive data from at least one of the object detection device 210, the communication device 220, the sensing unit 270 and the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation on the basis of traveling situation information. The processor 170 may perform the processing/determination operation on the basis of at least one of object data, HD map data, vehicle state data and position data.

2.1) Driving Plan Data Generation Operation

The processor 170 may generate driving plan data. For example, the processor 170 may generate electronic horizon data. The electronic horizon data may be understood as driving plan data in a range from a position at which the vehicle 10 is located to a horizon. The horizon may be understood as a point a predetermined distance before the position at which the vehicle 10 is located on the basis of a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be on the basis of data stored in at least one memory included in the vehicle 10.

The road data may include at least one of road slope data, road curvature data and road speed limit data. The road data may further include no-passing zone data. The road data may be on the basis of data received from an external server through the communication device 220. The road data may be on the basis of data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be on the basis of data received from an external server through the communication device 220.

The dynamic data may include various types of dynamic information which may be generated on roads. For example, the dynamic data may include construction information, variable speed road information, road condition information, traffic information, moving object information, etc. The dynamic data may be on the basis of data received from an external server through the communication device 220. The dynamic data may be on the basis of data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at at least one decision point on the main path.

3) Control Signal Generation Operation

The processor 170 may perform a control signal generation operation. The processor 170 may generate a control signal on the basis of the electronic horizon data. For example, the processor 170 may generate at least one of a power train control signal, a brake device control signal and a steering device control signal on the basis of the electronic horizon data.

The processor 170 may transmit the generated control signal to the driving control device 250 through the interface 180. The driving control device 250 may transmit the control signal to at least one of a power train 251, a brake device 252 and a steering device 254.

Autonomous Vehicle Usage Scenarios

Figure 9:
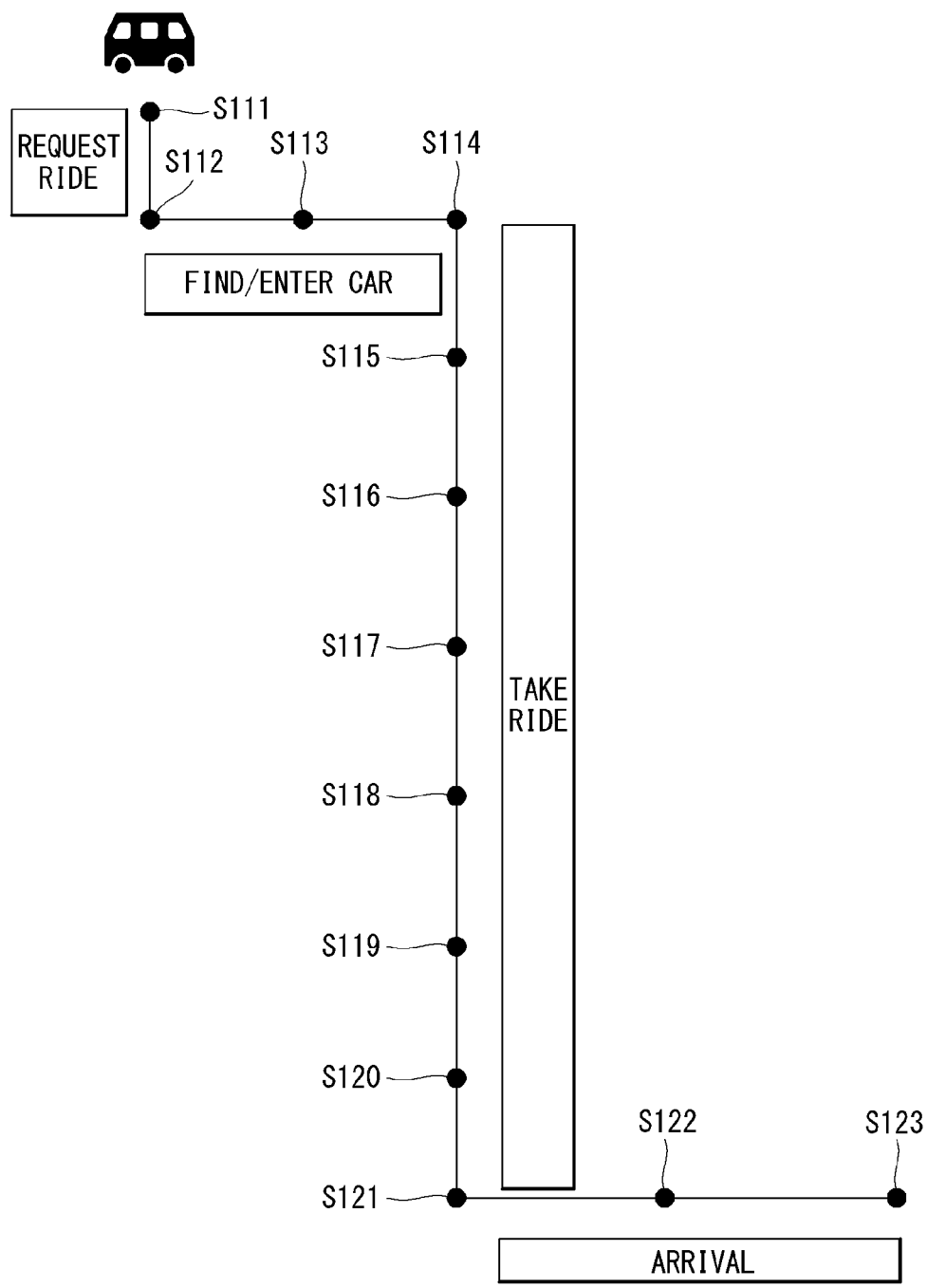
FIG. 9 is a diagram referred to in description of a usage scenario of a user according to an embodiment of the present disclosure.

FIG. 9 is a diagram referred to in description of a usage scenario of a user according to an embodiment of the present disclosure.

1) Destination Prediction Scenario

A first scenario S111 is a scenario for prediction of a destination of a user. An application which may operate in connection with the cabin system 300 may be installed in a user terminal. The user terminal may predict a destination of a user on the basis of user's contextual information through the application. The user terminal may provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device may scan a user to acquire body data and baggage data of the user. The body data and baggage data of the user may be used to set a layout. The body data of the user may be used for user authentication. The scanning device may include at least one image sensor. The image sensor may acquire a user image using light of the visible band or infrared band.

The seat system 360 may set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light may be disposed on the floor of the cabin. When a user riding in the vehicle is detected, the cabin system 300 may turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 may adjust at least one element of a seat that matches a user on the basis of obtained body information.

5) Personal Content Provision Scenario

A fifth scenario S115 is a personal content provision scenario. The display system 350 may receive user personal data through the input device 310 or the communication device 330. The display system 350 may provide content corresponding to the user personal data.

6) Item Provision Scenario

A sixth scenario S116 is an item provision scenario. The cargo system 355 may receive user data through the input device 310 or the communication device 330. The user data may include user preference data, user destination data, etc. The cargo system 355 may provide items on the basis of the user data.

7) Payment Scenario

A seventh scenario S117 is a payment scenario. The payment system 365 may receive data for price calculation from at least one of the input device 310, the communication device 330 and the cargo system 355. The payment system 365 may calculate a price for use of the vehicle by the user on the basis of the received data. The payment system 365 may request payment of the calculated price from the user (e.g., a mobile terminal of the user).

8) Display System Control Scenario of User

An eighth scenario S118 is a display system control scenario of a user. The input device 310 may receive a user input having at least one form and convert the user input into an electrical signal. The display system 350 may control displayed content on the basis of the electrical signal.

9) AI Agent Scenario

A ninth scenario S119 is a multi-channel artificial intelligence (AI) agent scenario for a plurality of users. The AI agent 372 may discriminate user inputs from a plurality of users. The AI agent 372 may control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 may provide content that may be viewed by all users together. In this case, the display system 350 may individually provide the same sound to a plurality of users through speakers provided for respective seats. The display system 350 may provide content that may be individually viewed by a plurality of users. In this case, the display system 350 may provide individual sound through a speaker provided for each seat.

11) User Safety Secure Scenario

An eleventh scenario S121 is a user safety secure scenario. When information on an object around the vehicle which threatens a user is obtained, the main controller 370 may control an alarm with respect to the object around the vehicle to be output through the display system 350.

12) Personal Belongings Loss Prevention Scenario

A twelfth scenario S122 is a user's belongings loss prevention scenario. The main controller 370 may acquire data about user's belongings through the input device 310. The main controller 370 may acquire user motion data through the input device 310. The main controller 370 may determine whether the user exits the vehicle leaving the belongings in the vehicle on the basis of the data about the belongings and the motion data. The main controller 370 may control an alarm with respect to the belongings to be output through the display system 350.

13) Alighting Report Scenario

A thirteenth scenario S123 is an alighting report scenario. The main controller 370 may receive alighting data of a user through the input device 310. After the user exits the vehicle, the main controller 370 may provide report data according to alighting to a mobile terminal of the user through the communication device 330. The report data may include data about a total charge for using the vehicle 10.

V2X (Vehicle-to-Everything)

FIG. 10 is a view illustrating V2X communication to which the present disclosure may be applied.

V2X communication refers to communication between a vehicle and all entities such as vehicle-to-Vehicle (V2V) designating communication between vehicles, vehicle-to-infrastructure (V2I) designating communication between a vehicle and an eNB or a road side unit (RSU), communication between a vehicle and an individual (pedestrian, bicyclist, driver, or passenger), vehicle-to-network (V2N), and the like.

The V2X communication may have the same meaning as or broader meaning than a V2X sidelink or the NR V2X.

V2X communication may be applicable to various services such as forward collision warning, automatic parking system, cooperative adaptive cruise control (CACC), control loss warning, traffic matrix warning, traffic vulnerable safety warning, emergency vehicle warning, speed warning on curved road, and traffic flow control and the like.

V2X communication may be provided via a PC5 interface and/or a Uu interface. In this case, in a wireless communication system supporting V2X communication, specific network entities for supporting communication between a vehicle and all entities. For example, the network entities may include a BS (eNB), a road side unit (RSU), a UE, an application server (e.g., a traffic safety server), and the like.

In addition, a UE performing V2X communication may be a vehicle UE (V-UE), a pedestrian UE, and a BS type (eNB type) RSU, a UE type RSU, a robot having a communication module, or the like, as well as a general handheld UE.

V2X communication may be performed directly between UEs or may be performed through the network entity(s). A V2X driving mode may be classified according to a method of performing V2X communication.

V2X communication V2X communication is required to support pseudonymity and privacy of a UE at the time of using the V2X application so that an operator or a third party cannot track a UE identifier within an area where the V2X is supported.

Terms frequently used in V2X communication are defined as follows.

RSU (Road Side Unit): RSU is a V2X-enabled unit capable of performing transmission and reception with a moving vehicle using a V2I service. The RSU is a fixed infrastructure entity that supports V2X applications and may exchange messages with other entities that support V2X applications. The RSU is a commonly used term in the existing ITS specification, and the reason for introducing the RSU in the 3GPP specification is to make a document easier to read in an ITS industry. The RSU is a logical entity that combines a V2X application logic with functionality of a BS (called a BS-type RSU) or a UE (called a UE-type RSU).

V2I service: A type of V2X service in which one side is a vehicle and the other side belongs to an infrastructure.

V2P service: A type of V2X service in which one side is a vehicle and the other side is a device carried by an individual (e.g., a handheld UE device carried by a pedestrian, a cyclist, a driver, or a passenger).

V2X service: A type of 3GPP communication service in which a transmitting or receiving device is involved in a vehicle.

V2X enabled UE: A UE supporting the V2X service.

V2V service: A type of V2X service in which both are vehicles.

V2V communication range: A range of direct communication between two vehicles participating in the V2V service.

The V2X application, called vehicle-to-everything (V2X), includes four types of (1) vehicle-to-vehicle (V2V), (2) vehicle-to-infrastructure (V2I), (3) vehicle-to-network (V2N), and (4) vehicle-to-pedestrian (V2P).

FIGS. 11A and 11B exemplify a resource allocation method in a sidelink in which V2X is used.

In the sidelink, different sidelink control channels (PSCCHs) may be allocated and spaced apart from each other in the frequency domain, and different sidelink shared channels (PSSCHs) may be allocated and spaced apart from each other. Alternatively, different PSCCHs may be continuously allocated in a frequency domain and PSSCHs may also be continuously allocated.

NR V2X

Support for V2V and V2X services in LTE was introduced to extend the 3GPP platform to the automotive industry during 3GPP releases 14 and 15.

Requirements for supporting enhanced V2X use cases are largely classified into four use case groups.

Vehicle platooning enables a platoon in which vehicles move together to be dynamically formed. All the vehicles of the platoon obtain information from a lead vehicle to manage the platoon. The information allows the vehicles to drive more harmoniously in a normal direction and go in the same direction and drive together.

Extended sensors allow row data or processed data collected via local sensors or live video images to be exchanged in vehicles, road site units, pedestrian devices, and V2X application servers. Vehicles may raise environmental awareness beyond what their sensors may detect, and more extensively and generally recognize a local situation. A high data rate is one of main features.

Advanced driving enables semi-automatic or fully-automatic driving. It allows each vehicle and/or RSU shares self-awareness data obtained from local sensors with nearby vehicles and allow each vehicle to synchronize and coordinate trajectory or manoeuvre. Each vehicle shares a driving intent with a vehicle which drives nearby.

Remote driving allows a remote driver or V2X application to drive a remote vehicle for passengers who are unable to drive on their own or in a remote vehicle in a hazardous environment. If fluctuations are limited and a route may be predicted such as public transportation, driving based on cloud computing may be used. High reliability and low standby time are key requirements.

Identifier for V2X Communication Via PC5

Each terminal (or user equipment (UE)) has a Layer-2 identifier for V2 communication through one or more PC5. This includes a source Layer-2 ID and a destination Layer-2 ID.

The source and destination Layer-2 IDs are included in a Layer-2 frame, and the Layer-2 frame is transmitted through a layer-2 link of PC5 identifying a source and a destination of Layer-2 on a frame.

The source and destination Layer-2 ID selection of a UE is based on a communication mode of the V2X communication of the PC5 of the layer-2 link. The source Layer-2 ID may differ between different communication modes.

If IP-based V2X communication is allowed, the UE is configured to use a link local IPv6 address as a source IP address. The UE may use the IP address for V2X communication of PC5, even without sending a Neighbor Solicitation and Neighbor Advertisement message for searching for duplicate addresses.

If one UE has an active V2X application that requires personal information protection supported in a current geographic area, the source Layer-2 ID may change over time and be randomized in order for the source UE (e.g., vehicle) to be tracked or identified from another UE only for a certain time. In the case of IP-based V2X communications, the source IP address must also change over time and be randomized.

Changes in identifiers of the source UE should be synchronized in a layer used for PC5. In other words, if an application layer identifier is changed, the source Layer-2 ID and the source IP address are also required to be changed.

Broadcast Mode

Figure 12:
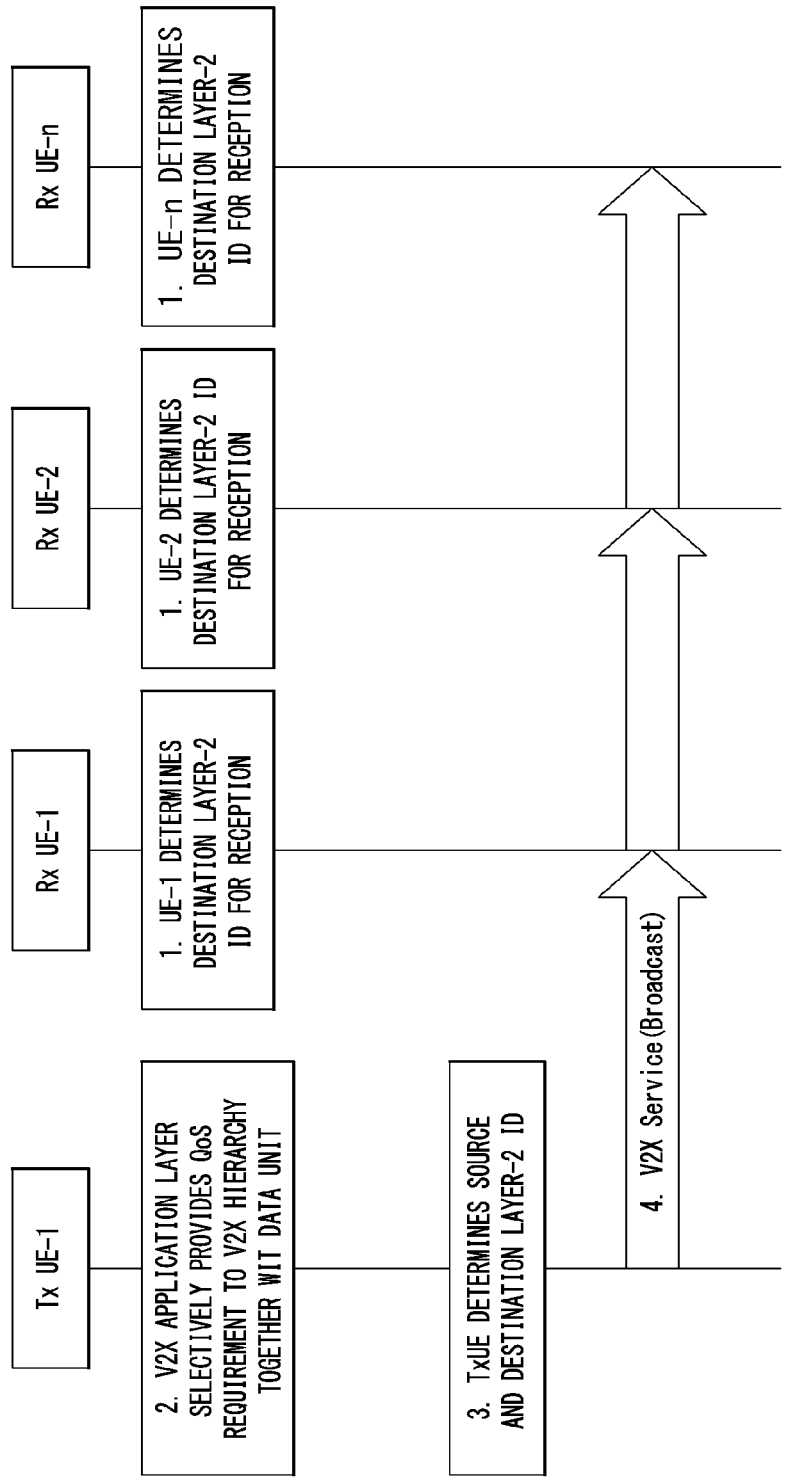
FIG. 12 is a diagram exemplifying a procedure for a broadcast mode of V2X communication using a PC5.

FIG. 12 is a view illustrating a procedure for a broadcast mode of V2X communication using PC5.

A receiving UE determines a destination Layer-2 ID for broadcast reception. The destination Layer-2 ID is transmitted to an AS layer of the receiving UE for reception.

A V2X application layer of a transmitting UE may provide a data unit and provide V2X application requirements.

The transmitting UE determines the destination Layer-2 ID for broadcast. The transmitting UE self-assigns a source Layer-2 ID.

One broadcast message transmitted by the transmitting UE transmits V2X service data using the source Layer-2 ID and the destination Layer-2

Hereinafter, various embodiments of the present disclosure will be described in detail with reference to the accompanying drawings.

Shark fin antennas that are mounted on general vehicles are suitable for long-range communication with base stations having a low frequency band, but are easily influenced by a car body in direction communication through a vehicle and have large differences in reception rate due to short-range communication, depending on the communication direction, so there is a need for a technology for making up for this problem.

A distributed antenna type is used as a plan for this problem and using this type of antenna can improve a reception rate and can use directional information.

A V2X message is usually encoded and transmitted and it is impossible to know the information of the transmission subject until decoding after receiving it. However, it is possible to know reception intensity information of the V2X, and by using this information, it is possible to acquire directional information of the V2X message.

FIGS. 13A and 13B are examples of an antenna position that can be applied in the present disclosure.

Referring to FIG. 13A, when two antennas are used in a vehicle, in order to achieve a high directional gain, the antennas are installed on the front and rear bumpers that can be positioned farthest in consideration of the overall length of the vehicle. Alternatively, the antennas may be installed on the left and right side view mirrors in consideration of the overall width of the vehicle.

Referring to FIG. 13B, when four antennas are used, for the same reason as the case when two antennas are used, the antennas may be installed on the front and rear bumpers and the left and right side view mirrors.

Figure 24:
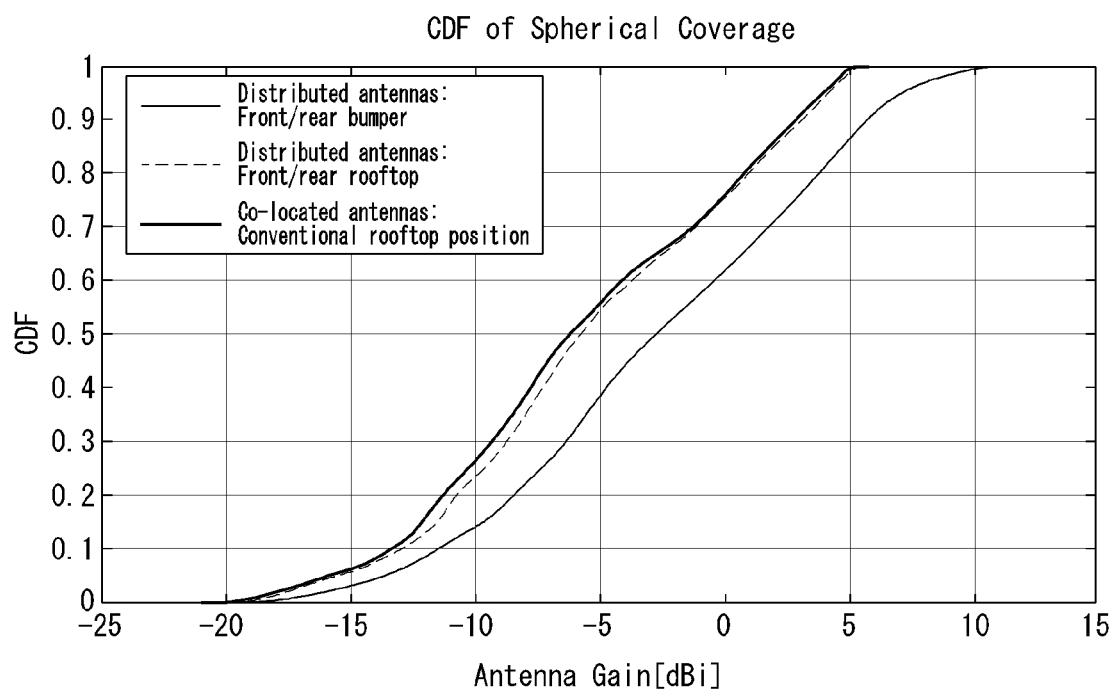
FIG. 24 is a graph showing CDF of spherical coverage for different antenna positions Accompanying drawings included as a part of the detailed description for helping understand the present disclosure provide embodiments of the present disclosure and are provided to describe technical features of the present disclosure with the detailed description.

Referring to FIG. 24, the directional gain is the highest when antennas are positioned on the front and rear of bumpers, as compared with when antennas are positioned at the front and rear of a rooftop or at the same position, so the power and the coverage can be improved.

A difference may occur in RF signal intensity of a V2X message that is received through these antennas, depending on the location of a transmitter, so it is possible to determine that an RF transmitter is positioned in a direction having high reception signal intensity. Accordingly, when determining danger possibility in the front, rear, left, and right directions, it is possible to use the antennas under the condition of giving priority (or filtering).

FIGS. 14A and 14B are examples of direction determination in accordance with an antenna signal that can be applied in the present disclosure. FIGS. 14A and 14B are examples of direction determination in accordance with an antenna signal that can be applied in the present disclosure.

Referring to FIG. 14A, as for the intensity of a signal that a following vehicle 1420 receives from a forward vehicle 1410, the first path is shorter than the second path, so the intensity of a signal that is received to the front bumper of the following vehicle 1420 is larger than the intensity of a signal received to the rear bumper. Accordingly, the vehicle 1420 can determined that the transmission location of the signal is in the front direction.

Referring to FIG. 14B, as for the intensity of a signal that a forward vehicle 1430 receives from a following vehicle 1440, the second path is shorter than the first path, so the intensity of a signal that is received to the rear bumper of the forward vehicle 1430 is larger than the intensity of a signal received to the front bumper. Accordingly, the vehicle 1430 can determined that the transmission location of the signal is in the rear direction.

Table 1 is an example of RSSI (Received Signal Strength Indication) measured by antennas positioned on a vehicle. Referring to the following Table 1, the Rx0 port is measured higher by 3 dBm at #$ and #5, as compared with the Rx1 port. When the Rx0 is an antenna positioned on the front surface of a vehicle and the Rx1 is an antenna positioned on the rear surface of the vehicle, it is possible to determine that a signal has been transmitted from the front.

TABLE 1

| # | NormRssi | |
|---|---|---|
| | Norm RSSI Rx0 (dBm) | Norm RSSI Rx1 (dBm) |
| 0 | −47.2 | −46.6 |
| 1 | −48.7 | −48.2 |
| 2 | −48.8 | −48.3 |
| 3 | −49.0 | −48.6 |
| 4 | −60.5 | −63.2 |
| 5 | −60.2 | −63.3 |
| 6 | −47.4 | −47.1 |
| 7 | −48.8 | −48.5 |
| 8 | −48.8 | −48.5 |
| 9 | −48.2 | −48.1 |
| 10 | 0.0 | 0.0 |
| 11 | 0.0 | 0.0 |
| 12 | 0.0 | 0.0 |

By using the present disclosure, it is possible to preferentially receive a signal in a desired reception direction. Further, in transmission, it is possible to transmit a signal in a desired transmission direction in accordance with regulations. When a large amount of V2X messages have to be processed through several vehicles, it is possible to preferentially process dangerous element messages, and if all of them cannot be processed, it is possible to filter signals. Accordingly, it is possible to reduce a processing delay of the dangerous element messages and to process the V2X messages in subordinate preference.

To this end, the present disclosure extracts signal intensity information in the process of combining signals that are received through a distributed multi-antenna. The transmission locations of received signals are specified on the basis of differences in the signal intensity information and the installation directions of the antennas. The received V2X messages are put and managed in different queues in accordance with the transmission locations of the signals. A vehicle acquires road information and obstacle information in specific directions through sensing data and map information about a surrounding environment, thereby being able to determine the degree of danger and a direction having a high degree of danger.

The queue that manages a V2X message that is received in the direction having a high degree of danger is processed in high preference and the queue that manages a V2X message that is received in the direction having a low degree of danger is processed in low preference.

The transmission direction or the reception port of a V2X message can be changed, so when there is a difference over a predetermined time between the direction of a signal according to a specified transmission location and the direction of a signal actually measured after the V2X message is decoded, it is possible to reset the transmission direction set in the V2X message.

Figure 15:
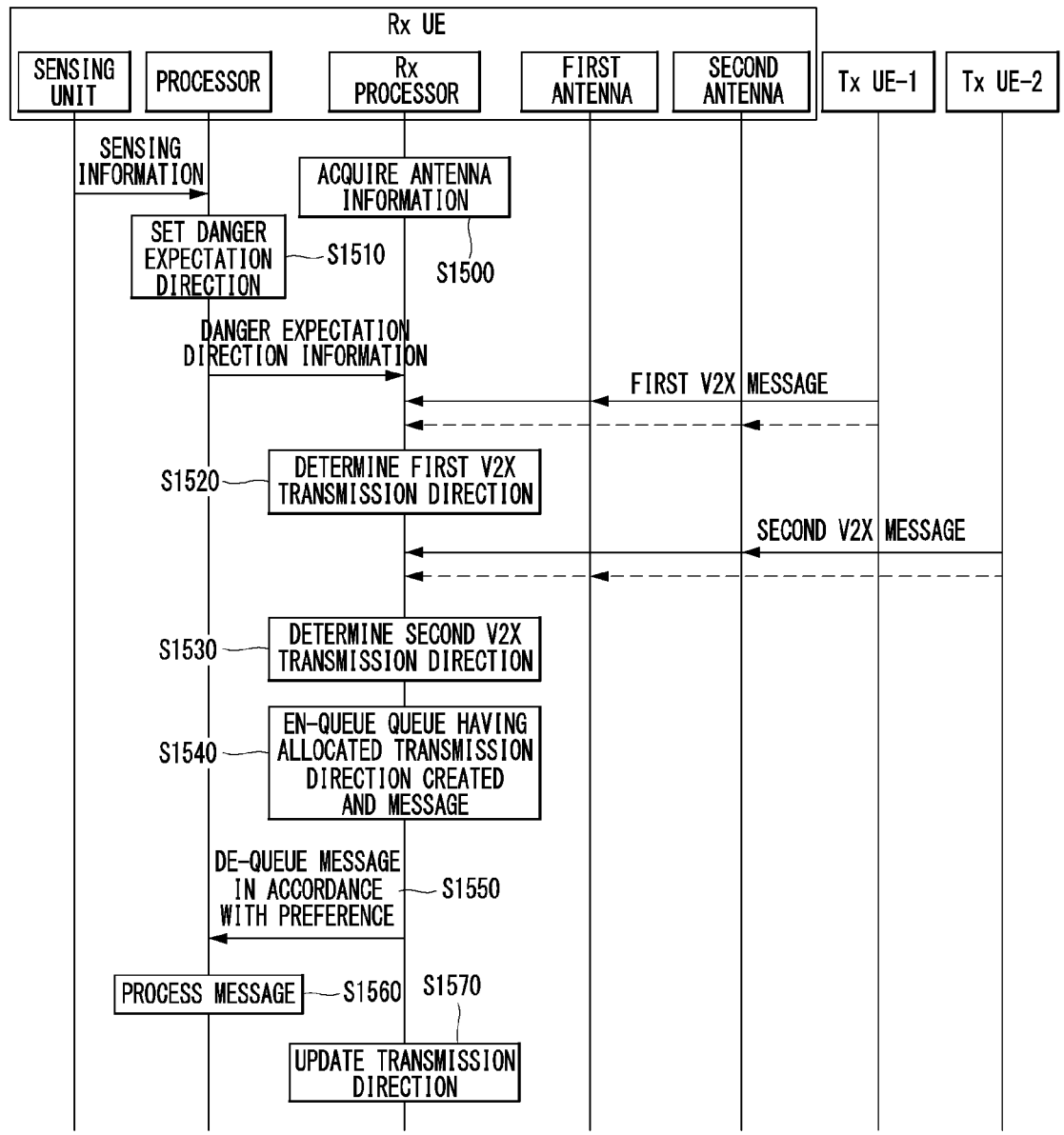
FIG. 15 is an embodiment to which the present disclosure can be applied.

FIG. 15 is an embodiment to which the present disclosure can be applied. In the present disclosure, a terminal may include a vehicle 10.

A reception terminal acquires antenna information through an Rx processor (S1500). The number of antenna ports or the direction information of antennas positioned on the terminal is included in the antenna information.

The processor sets a danger expectation direction using sensing information acquired through a sensing unit (S1510). The processor can determine a road state and the driving states of surrounding vehicles, using map information and sensing information, and accordingly, the processor can set a direction in which attention is required in movement of the reception terminal. The danger expectation degree may be quantified and set for each antenna direction of the reception terminal.

On the basis of the signal intensity of a first V2X message that is transmitted from a first transmission terminal, it is possible to determine the transmission direction of the first V2X message (S1520). For example, a first V2X message that is transmitted from the first transmission terminal is received through a first antenna and a second antenna, the intensity of the signals is extracted in the process of combining the message in the Rx processor, as described above, and the transmission direction is determined on the basis of the difference of the intensity. When the intensity of the signal received through the first antennal is larger than the intensity of the signal received through the second antenna, it is possible to determine that the first transmission terminal is in the direction in which the first antenna is positioned.

On the basis of the signal intensity of a second V2X message that is transmitted from a second transmission terminal, it is possible to determine the transmission direction of the second V2X message (S1530). For example, when the signal intensity of the second V2X message received through the second antenna is larger than the signal intensity at the first antenna, it is possible to determine that the second transmission terminal is in the direction in which the second antenna is positioned.

The Rx processor creates and maps a Queue to a transmission direction in accordance with a set transmission direction on the basis of antenna information. A message received in the direction in which an antenna is positioned is stored in a queue mapped for the transmission direction (S1540). For example, on the basis of antenna information, a first queue mapped in the direction in which the first antenna is positioned and a second queue mapped in the direction in which the second antenna is positioned are created, and a message received in the direction in which the first antenna is positioned is stored in the first queue and a message in the direction in which the second antenna is positioned is stored in the second queue. These can be classified using a source Layer-2 ID included in a V2X message. That is, when a first V2X message includes a first source Layer-2 ID, the Rx processor can en-queue a V2X message including the first source Layer-2 ID into a queue mapped to the direction in which the first V2X message is transmitted. Alternatively, the queues may be classified through channels respectively allocated for antenna ports. These queues have a preference value for de-Queue.

Each queue has a preference in accordance with danger expectation direction information, and messages en-queued in the queues in accordance with corresponding preferences are de-queued and transmitted to a processor (S1550). For example, when the processor determines that danger is expected ahead of the reception terminal and the first antenna is an antenna positioned on the front surface of the reception terminal, the first queue has a higher preference than the second queue. The Rx processor can de-queue the first V2X message en-queued in the first queue and then transmit it to the processor.

The processor decodes and processes transmitted V2X message in accordance with the preference (S1560). Processing of the V2X messages can be performed step by step. For example, depending on the distance from the transmission terminal, when the reception terminal approaches a first control region, set primary control may be performed, and when the reception terminal approaches a second control region, set secondary control may be performed. Accordingly, the reception terminal can preferentially process a V2X message in a direction having a high degree of danger expectation, and can prevent danger generation by performing control step by step in accordance with the distance.

The Rx processor examines whether the transmission direction of a V2X message is available with a predetermined period (S1570). This may be the manner of S1520 and S1530, and if the transmission direction is not available, the transmission direction of the corresponding message can be reset.

Figure 16:
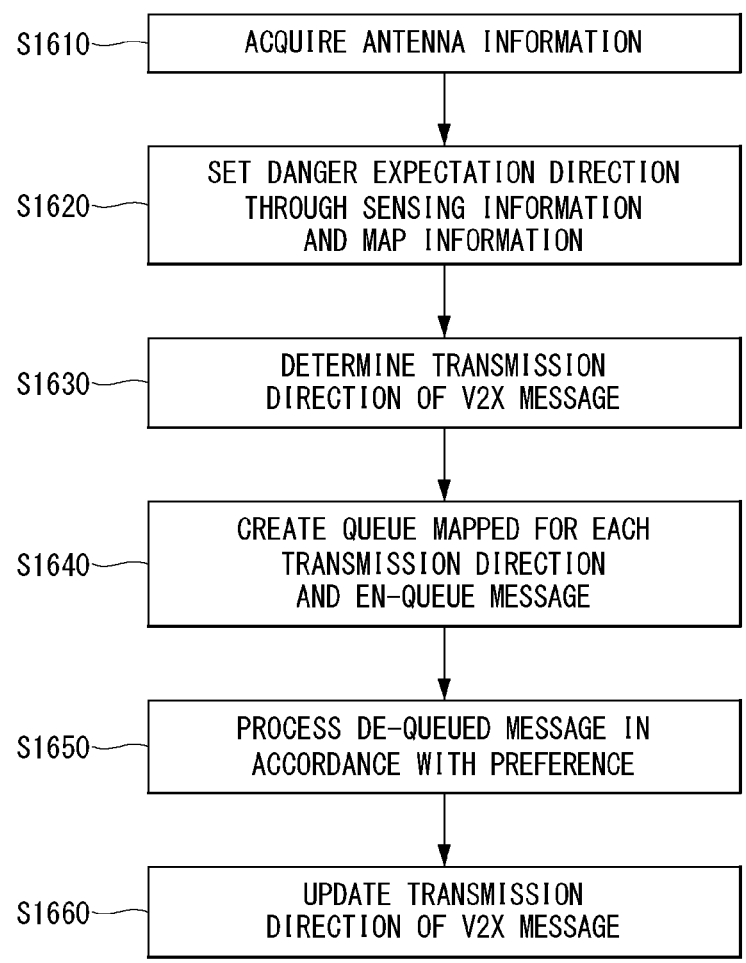
FIG. 16 is an embodiment of a terminal to which the present disclosure can be applied.

FIG. 16 is an embodiment of a terminal to which the present disclosure can be applied.

A terminal acquires antenna information of the terminal set in a memory (S1610). The antenna information includes the number of antenna ports and the direction information of antennas.

The terminal sets a danger expectation direction using sensing information acquired through a sensing unit or map information that can be acquired through a traffic server (S1620). The danger expectation direction, for example, may be a direction in which a crossroad, a crosswalk, a construction area, etc. are positioned, or may be a direction in which another dangerous vehicle is positioned. The terminal may require a help of a V2X message in some case to set the danger expectation direction. For example, when sensing information is not correct due to influence by rain, snow, or the like, or when it is impossible to accurately determine an object that is sensed by sensing information, it is possible to preferentially receive a V2X message in the set danger expectation direction using sensing information and map information. On the basis of the V2X message acquired in this way, the terminal can reset the danger expectation direction.

The terminal determines the transmission direction of a received V2X message using difference in signal intensity (S1630).

The terminal creates a queue mapped to each transmission direction and en-queues a V2X message transmitted in the direction in which a corresponding antenna is positioned in the mapped queue (S1640). The queues each have a preference value, and in these preference values, the queue mapped to the antenna related to a danger expectation direction may have the highest preference, and the preference values may be quantified and set.

The terminal de-queues and processes first a V2X message in the queue having a high preference. Since the preferences are set in accordance with a danger expectation direction, the terminal can perform a control operation on the basis of a V2X message in the direction in which danger is expected. This control operation can also be performed step by step on the basis of the distance between the terminal and the transmission point of the V2X message. For example, as the terminal comes closer to the transmission point, the terminal can perform an active evasion operation.

The set transmission direction of a V2X message may be changed by movement of the terminal or the V2X message transmission terminal, so the terminal can periodically update the transmission direction (S1660). This can be performed by determining again the transmission direction of the V2X message using the difference in signal intensity of antennas, and by updating the transmission direction set in the V2X message when the transmission direction has been changed.

Figure 17:
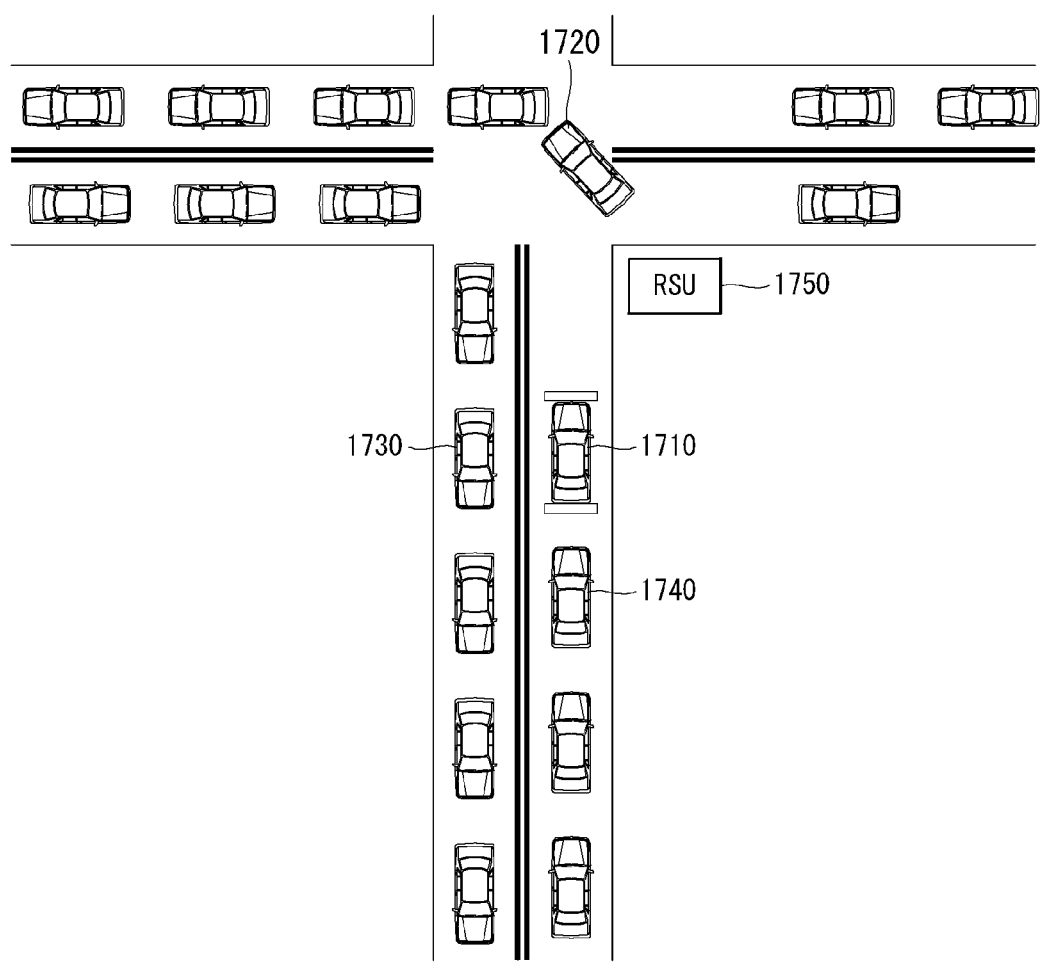
FIG. 17 is an example to which the present disclosure can be applied.

FIG. 17 is an example to which the present disclosure can be applied.

A reception vehicle 1710 can know direction information of antennas installed on the reception vehicle 1710 using antenna information. The reception vehicle 1710 can determine that it is entering a crossroad and set the front as a danger expectation direction, using sensing information and map information. By determining signal intensity of V2X messages that are received from transmission vehicles 1720, 1730, and 1740, it is possible to en-queue the V2X message transmitted from the transmission vehicle 1720 in the danger expectation direction into a queue having the highest preference and to en-queue the V2X message transmitted from a following vehicle 1740 into a queue having the lowest preference. The reception vehicle 1720 can efficiently cope with danger occurrence by processing first the V2X message transmitted from the forward transmission vehicle 1720. In setting of the danger expectation direction, a V2X message received from another vehicle can be obviously used, and a V2X message transmitted from an RSU 1750 can also be used.

Figure 18:
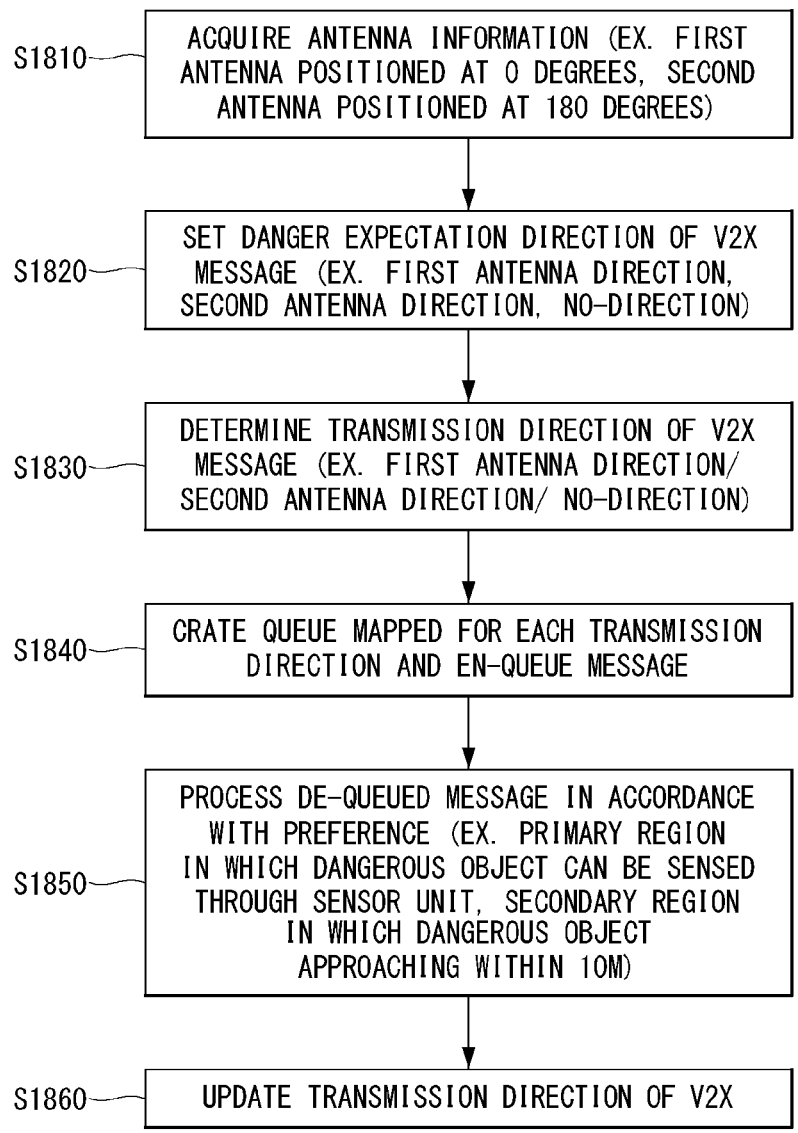
FIG. 18 is an embodiment of a terminal using two antennas to which the present disclosure can be applied.

FIG. 18 is an embodiment of a terminal using two antennas to which the present disclosure can be applied.

A terminal, when measuring an angle clockwise from the center point of a front bumper of a vehicle, can determine that a first antenna is positioned at front 0 degrees and a second antenna is positioned at rear 180 degrees through antenna information (S1810).

The terminal can determine that there is a crossroad in the driving direction and a straight road at the rear through map information, and when determining that there is no object approaching at a high speed at the rear, it can set the direction indicating the crossroad as a danger expectation direction through sensing information (S1820).

Since the terminal uses two antennas, for example, it is possible to determine the transmission direction of a received V2X on the basis of three directions of the front in which a first antenna is positioned, the rear in which a second antenna is positioned, and no-direction. This can be determined on the basis of the difference in signal intensity described above, and when it is not considered that a V2X message is transmitted from the front or the rear such as when the determined transmission direction is not constant or when the difference in signal intensity is a predetermined range or less, no-direction can be set.

The terminal can create a first queue mapping the front, a second queue mapping the rear, and a third queue mapping the no-direction, and for example, can classify the transmission direction of a V2X message and en-queue the transmission direction into a mapped queue in accordance with a source Layer-2 ID included in the V2X message (S1840).

Each queue has a preference value based on a danger expectation direction and the message in the queue having a higher preference value can be processed first (S1850). When the first queue is mapped to the front and the terminal indicates the front as a danger expectation direction on the basis of a forward crossroad, the first queue has the highest preference value, so the message included in the first queue is processed first. The message processing can be performed by a control operation of the terminal on the basis of the V2X message, and the terminal can perform the control operation step by step in accordance with the distance gap from the V2X message transmission location in the danger expectation direction. For example, when a distance at which a sensor unit of the terminal can sense a V2X message transmission location is set as a primary region, a control operation for low-speed driving can be performed in the primary region, and when a range within 10 m from a V2X message transmission point is set as a secondary region, a control operation for emergency stop can be performed in the secondary region. Accordingly, the terminal can efficiently cope with a dangerous object that is sensed in the danger expectation direction.

The terminal determines whether a corresponding V2X transmission direction and a mapped queue are available using the signal intensity difference of V2X messages periodically received, and if a transmission direction is not en-queued in an appropriate queue, the terminal updates the transmission direction of a V2X message and newly maps a queue (S1860).

Figure 19:
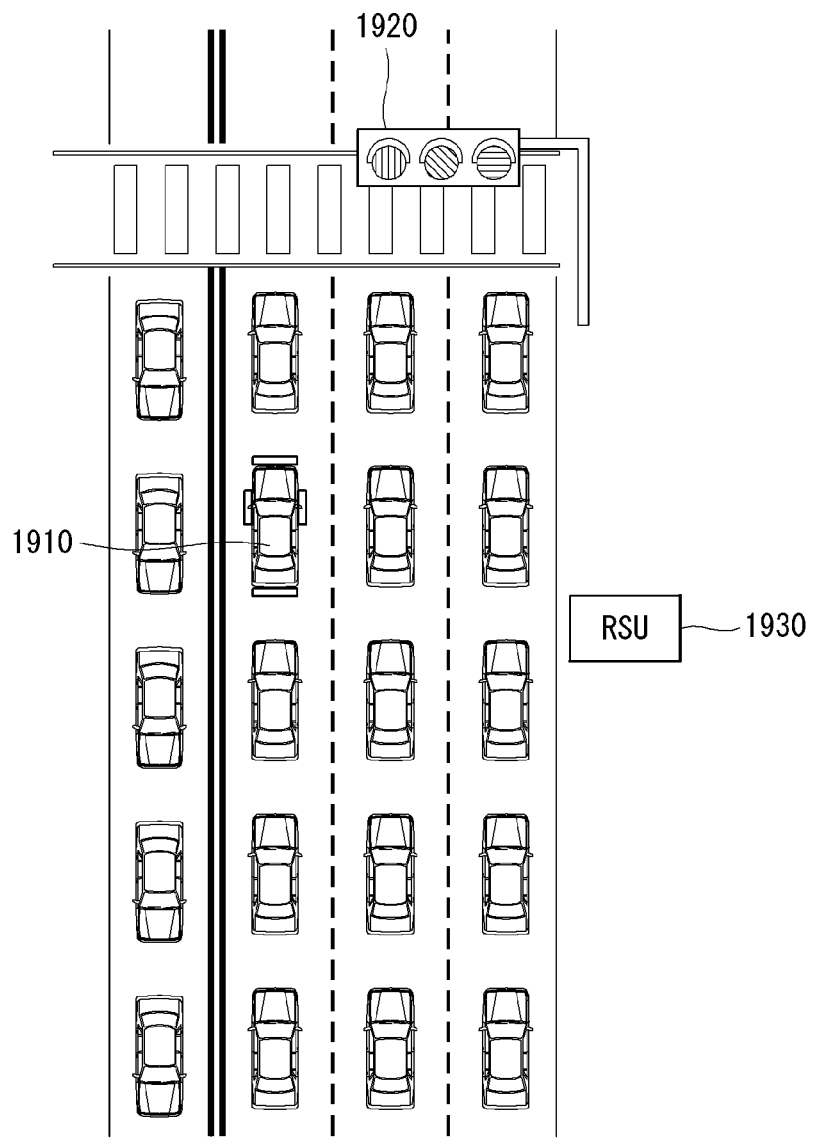
FIG. 19 is an embodiment of a terminal using four antennas to which the present disclosure can be applied.

FIG. 19 is an embodiment of a terminal using four antennas to which the present disclosure can be applied.

When a terminal 1910 uses fourth antennas at the front, rear, left, and right, the transmission direction of a received V2X can be set as follows in accordance with the signal intensity at each of the antennas.

1) front: (front>rear) AND (left=right)
2) rear: (front<rear) AND (left=right)
3) left: (front=rear) AND (left=right)
4) right: (front=rear) AND (left=right)
5) front left: (front>rear) AND (left>right)
6) front right: (front>rear) AND (left<right)
7) rear left: (front<rear) AND (left>right)
8) rear right: (front<rear) AND (left<right)
9) no-direction: (front=rear) AND (left=right)

In this case, the meaning that the signal intensity is the same (=) means that a signal intensity difference does not exceed a predetermined range, and the predetermined range may be set in accordance with the front and rear or the left and right.

Referring to FIG. 19, the reception terminal 1910 may be required to preferentially process a V2X message related to a signal of a traffic light 1920 more than a V2X message from a surrounding vehicle. Accordingly, it is possible to preferentially process a V2X message transmitted from an RSU 1930 by determining the location of the RSU 1930 transmitting a signal of the traffic light 1920 and by setting the direction of the RSU 1930 as a danger expectation direction, using sensing information and map information when setting a danger expectation direction.

Figure 20:
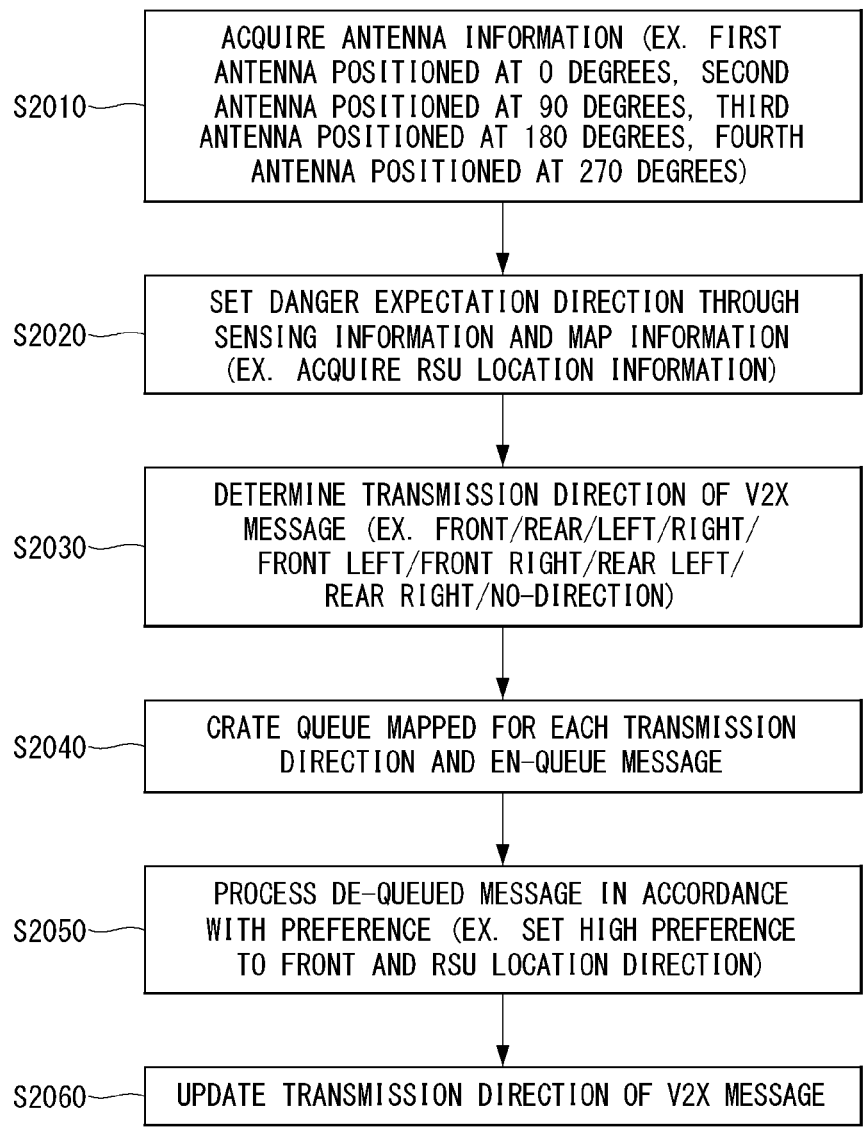
FIG. 20 is an embodiment of a terminal using four antennas to which the present disclosure can be applied.

FIG. 20 is an embodiment of a terminal using four antennas to which the present disclosure can be applied.

A terminal, when measuring an angle clockwise from the center point of a front bumper of a vehicle, can determine that a first antenna is positioned at front 0 degrees, a second antenna is positioned at 90 degrees, a third antenna is positioned at 180 degrees, and a fourth antenna is positioned at 270 degrees through antenna information (S2010).

The terminal can determine that there is a crosswalk in the driving direction and the location of the RSU transmitting traffic light signal through map information, and when determining that there is no object approaching at a high speed at the rear, it can set the direction indicating a crossroad as a danger expectation direction through sensing information (S2020). Further, it is possible to determine that the lane in which the subject vehicle is driven is a first lane, and in this case, a low preference value can be set for the left direction and the rear left direction.

Since the terminal uses four antennas, it is possible to determine the transmission direction of a received V2X message, for example, as described above, on the basis of nine directions (S2030). This can be determined on the basis of the difference in signal intensity described above, and when it is impossible to specify a transmission direction such as when the determined transmission direction is not constant or when the difference in signal intensity is a predetermined range or less, no-direction can be set.

The terminal can create a queue that is mapped to the transmission direction of the V2X message, and can classify and en-queue the transmission direction of the V2X message into the mapped queue in accordance with the source Layer-2 ID included in the V2X message (S2040).

Each queue has a preference value based on a danger expectation direction and the message in the queue having a higher preference value can be processed first (S20050). When the first queue is mapped to the front and the terminal indicates the front as a danger expectation direction on the basis of a crossroad in the front, the first queue has the highest preference value, so the message included in the first queue is processed first. The message processing can be performed by a control operation of the terminal on the basis of the V2X message, and the terminal can perform the control operation step by step in accordance with the distance gap from the V2X message transmission location in the danger expectation direction. Further, in order to allocate a preference value to a queue, it is possible to use a V2X message that is received through the RSU, and to this end, the queue mapped to the direction indicating the location of the RSU can have a high preference value. Accordingly, the terminal can efficiently cope with a dangerous object that is sensed in the danger expectation direction.

The terminal determines whether a corresponding V2X transmission direction and a mapped queue are available using the signal intensity difference of V2X messages periodically received, and if a transmission direction is not en-queued in an appropriate queue, the terminal updates the transmission direction of a V2X message and newly maps a queue (S2060).

Figure 21:
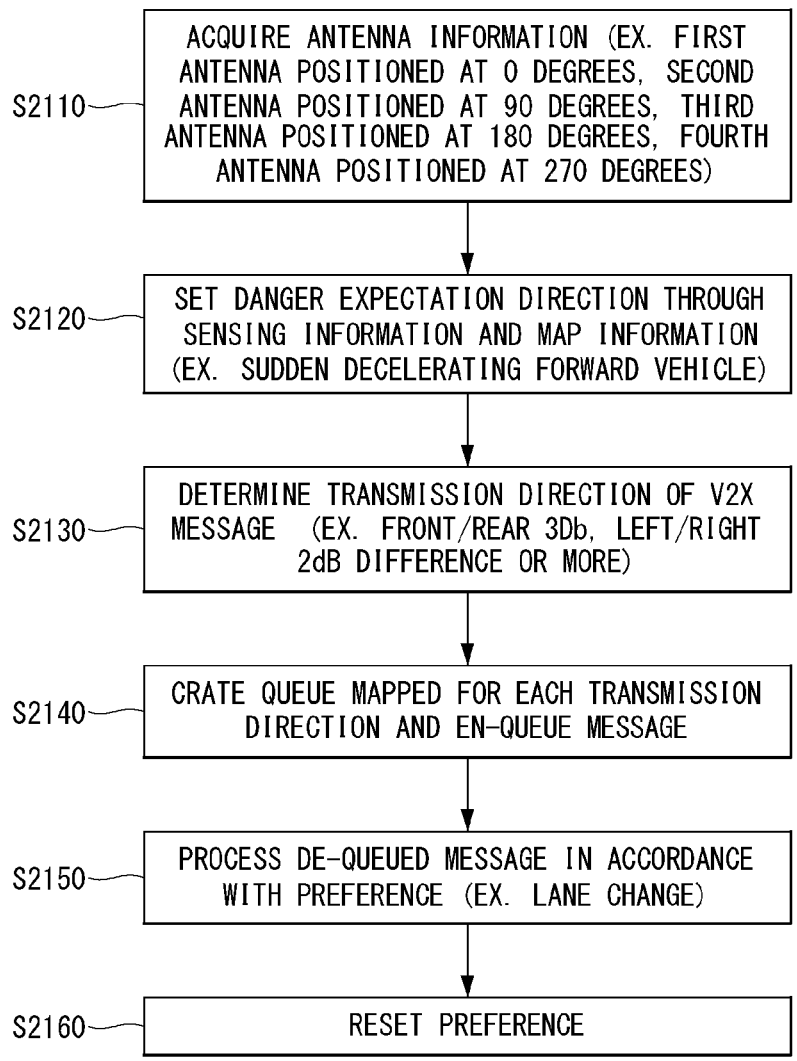
FIG. 21 is an embodiment of a terminal using four antennas to which the present disclosure can be applied.

FIG. 21 is an embodiment of a terminal using four antennas to which the present disclosure can be applied.

A terminal, when measuring an angle clockwise from the center point of a front bumper of a vehicle, can determine that a first antenna is positioned at front 0 degrees, a second antenna is positioned at 90 degrees, a third antenna is positioned at 180 degrees, and a fourth antenna is positioned at 270 degrees through antenna information (S2110).

The terminal can determine that there is a crosswalk in the driving direction and the location of an RSU transmitting a traffic light signal through map information, and when sensing a vehicle suddenly decelerating in the front, it can set the front as a danger prediction direction through sensing information (S2120). Further, it is possible to determine that the lane in which the subject vehicle is driven as a second lane and can determine that it is possible to change to the first lane.

Since the terminal uses four antennas, it is possible to determine the transmission direction of a received V2X message, for example, as described above, on the basis of nine directions (S2130). This can be determined on the basis of the difference in signal intensity described above, and when it is impossible to specify a transmission direction such as when the determined transmission direction is not constant or when the difference in signal intensity is a predetermined range or less, no-direction can be set. For example, the predetermined range may be set such that the signal difference in the front/rear direction is 3 dB or more and the signal difference in the left/right direction is 2 dB or more.

The terminal can create a queue that is mapped to the transmission direction of the V2X message, and can classify and en-queue the transmission direction of the V2X message into the mapped queue in accordance with the source Layer-2 ID included in the V2X message (S2140).

Each queue has a preference value based on a danger expectation direction and the message in the queue having a higher preference value can be processed first (S2150). When the first queue is mapped to the front and the terminal indicates the front as a danger expectation direction on the basis of a forward vehicle that is being suddenly decelerated, the first queue has the highest preference value, and in order to change a lane to the first lane, the queues mapped to the left/front left/rear left directions may also have high preferences. However, the queues mapped to the right/front right/rear right directions in which possibility that danger is sensed is relatively low may have low preferences. Messages stored in the queues are processed in accordance with the preference values, the message processing can be performed by a control operation of the terminal on the basis of the V2X message, and the terminal can perform the control operation step by step in accordance with the distance gap from the V2X message transmission location in the danger expectation direction. When determining that the speed of a vehicle approaching from the rear is high and it is possible to change a lane to the first lane, the terminal performs changing a lane to the first lane. Accordingly, the terminal can efficiently cope with a dangerous object that is sensed in the danger expectation direction.

When the terminal gets out of a dangerous situation, the terminal can determine again a danger expectation direction, and accordingly, it is possible to reset the preferences set to the queues (S2160). That is, the vehicle that has changed a lane to the first lane can reset the preference values of the queues mapped to the left/front left/rear left directions.

Figure 22:
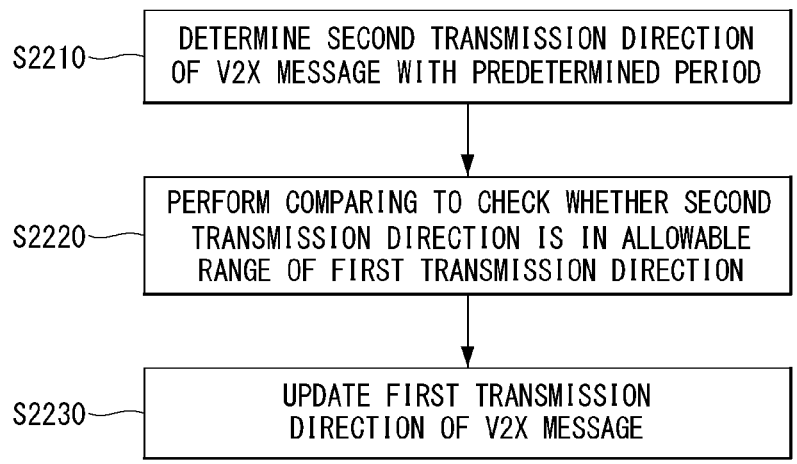
FIG. 22 is an embodiment of transmission direction update to which the present disclosure can be applied.

FIG. 22 is an embodiment of transmission direction update to which the present disclosure can be applied.

In accordance with a transmission terminal location of a first V2X message, in order to examine a set first transmission direction, the terminal determines the second transmission direction of a V2X message received at a predetermined period (S2210). This is determined in the same way through the signal intensity described above.

Comparing is performed to check whether the second transmission direction is in an allowable range of the first transmission direction (S2220). For example, when the second transmission direction of a V2X message of which the first transmission direction is set as the right direction (90 degrees) is received ten times or more between 170 degrees and 190 degrees, or when the difference between the first transmission direction and the second transmission direction is 45 degrees or more and the number of times of receiving the V2X message in the second transmission direction is 10 or more, it can be considered as being out of an allowable range.

When the difference between the first transmission direction and the second transmission direction is the allowable range or more, the terminal updates the first transmission direction of the V2X message in accordance with the second transmission direction (S2230). Thereafter, the received V2X message is en-queued into the queue that is mapped to the updated first transmission direction.

General Devices to which the Present Disclosure can be Applied

Figure 23:
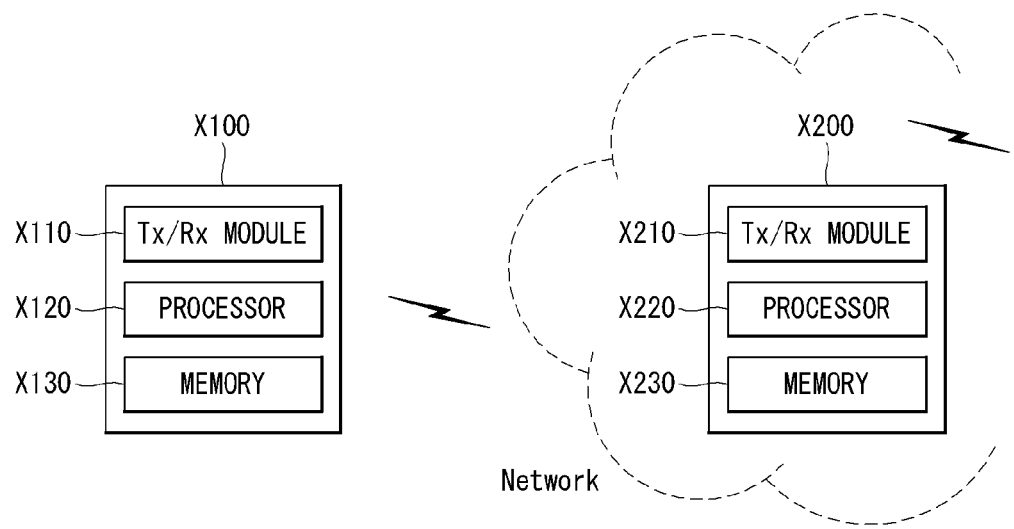
FIG. 23 is an example of a general device to which the present disclosure can be applied.

Referring to FIG. 23, a server X200 according to a proposed embodiment may be a MEC server or a cloud server and may include a communication module X210, a processor X220, and a memory X230. The communication module X210 is also referred to as a radio frequency (RF) unit. The communication module X210 may be configured to transmit various signals, data, and information to an external device and to receive various signals, data, and information from the external device. The server X200 may be connected with the external device in a wire and/or wireless manner. The communication module X210 may be configured to be divided into a transmitter and a receiver. The processor X220 can control the generation operation of the server X200 and the server X200 may be configured to perform a function of calculating information, etc. to transmit/receive to/from the external device. Further, the processor X220 may be configured to perform a server operation proposed in the present disclosure. The processor X220 can control the communication module X210 to transmit data or a message to a UE, another vehicle, or another server in accordance with a proposal of the present disclosure. The memory X230 can store calculated information, etc. for a predetermined time, and may be replaced by a component such as a buffer.

Further, the detailed configuration of the terminal device X100 and the server 200 described above may be independently applied to the contents described in various embodiments of the present disclosure, or may be implemented such that two or more embodiments are simultaneously applied, and detailed contents are omitted for clarity.

Embodiment 1

A method of controlling a multi-antenna of a reception terminal in an autonomous driving system (Automated Vehicle & Highway Systems) includes: acquiring directional information of the multi-antenna installed to receive a V2X message in the reception terminal; setting a danger expectation direction indicating the direction in which an object, which requires attention, is positioned, through first sensing information or map information; receiving the V2X message and determining a first transmission direction of the V2X message on the basis of the directional information; en-queuing the V2X message to a queue mapped to the first transmission direction; and de-queuing the V2X message on the basis of a preference value set in the queue, in which the multi-antenna includes a first antenna and a second antenna directed in a direction symmetric to the first antenna, the first transmission direction is determined on the basis of a signal intensity difference value of the V2X message received at the first antenna and the second antenna, and the preference value is based on the danger expectation direction.

Embodiment 2

In Embodiment 1,
the method of controlling a multi-antenna further includes: performing a control operation on the basis of the V2X message; resetting the danger expectation direction through second sensing information or the map information; and resetting the preference value on the basis of the reset danger expectation direction, in which the control operation is based on a distance between the object and the reception terminal.

Embodiment 3

In Embodiment 1,
the method of controlling a multi-antenna further includes: determining a second transmission direction of the V2X message on the basis of the directional information; and updating the first transmission direction on the basis of the second transmission direction, in which determining of the second transmission direction is performed at every specific period and is based don the signal intensity difference value, and updating of the first transmission direction is performed when the transmission direction exceeds an allowable range of the first transmission direction.

Embodiment 4

In Embodiment 1,
the V2X message includes a source Layer-2 ID, and the first transmission direction is determined for each source Layer-2 ID.

Embodiment 5

In Embodiment 1,
the first antenna is positioned on a front surface of the reception terminal and the second antenna is positioned on a rear surface of the reception terminal.

Embodiment 6

In Embodiment 5,
the first transmission direction includes values that indicate a front direction, a rear direction, or that a direction cannot be specified with respect to the reception terminal.

Embodiment 7

In Embodiment 5,
the multi-antenna includes a third antenna positioned on a left side of the reception terminal and a fourth antenna positioned on a right side of the reception terminal.

Embodiment 8

In Embodiment 7,
the first transmission direction includes values that indicate a front direction, a rear direction, a left direction, a right direction, a front left direction, a front right direction, a rear left direction, a rear right direction, or that a direction cannot be specified with respect to the reception terminal.

Embodiment 9

In Embodiment 6 or Embodiment 8,
when the signal intensity difference value does not exceed a predetermined range, the value indicating that a direction cannot be specified is determined as the first transmission direction.

Embodiment 10

In Embodiment 1,
the method of controlling a multi-antenna further includes, when receiving location information of an RSU (Road side unit) transmitting a traffic light signal, setting the danger expectation direction on the basis of the location information, in which the location information is acquired using the map information.

Embodiment 11

A reception terminal for a method of controlling a multi-antenna in an autonomous driving system (Automated Vehicle & Highway Systems) includes: a sensing unit; a communication module, a reception (Rx) processor; and a processor, in which the processor: acquires directional information of the multi-antenna installed to receive a V2X message in the reception terminal; sets a danger expectation direction indicating the direction in which an object, which requires attention, is positioned, through first sensing information or map information; receives the V2X message and determines a first transmission direction of the V2X message on the basis of the directional information; en-queues the V2X message to a queue mapped to the first transmission direction; and de-queues the V2X message on the basis of a preference value set in the queue; and the multi-antenna includes a first antenna and a second antenna directed in a direction symmetric to the first antenna, the first transmission direction is determined on the basis of a signal intensity difference value of the V2X message received at the first antenna and the second antenna, and the preference value is based on the danger expectation direction.

Embodiment 12

In Embodiment 11,
the processor performs a control operation on the basis of the V2X message, resets the danger expectation direction through second sensing information or the map information, and resets the preference value on the basis of the reset danger expectation direction, and the control operation is based on a distance between the object and the reception terminal.

Embodiment 13

In Embodiment 11,
the processor determines a second transmission direction of the V2X message on the basis of the directional information and updates the first transmission direction on the basis of the second transmission direction, through the reception processor; and determining of the second transmission direction is performed at every specific period and is based don the signal intensity difference value, and updating of the first transmission direction is performed when the transmission direction exceeds an allowable range of the first transmission direction.

Embodiment 14

In Embodiment 11,
the V2X message includes a source Layer-2 ID, and the first transmission direction is determined for each source Layer-2 ID.

Embodiment 15

In Embodiment 11,
the first antenna is positioned on a front surface of the reception terminal and the second antenna is positioned on a rear surface of the reception terminal.

Embodiment 16

In Embodiment 15,
the first transmission direction includes values that indicate a front direction, a rear direction, or that a direction cannot be specified with respect to the reception terminal.

Embodiment 17

In Embodiment 15,
the multi-antenna includes a third antenna positioned on a left side of the reception terminal and a fourth antenna positioned on a right side of the reception terminal.

Embodiment 18

In Embodiment 17,
the first transmission direction includes values that indicate a front direction, a rear direction, a left direction, a right direction, a front left direction, a front right direction, a rear left direction, a rear right direction, or that a direction cannot be specified with respect to the reception terminal.

Embodiment 19

In Embodiment 11,
when receiving location information of an RSU (Road side unit) transmitting a traffic light signal, the processor sets the danger expectation direction on the basis of the location information, and the location information is acquired using the map information.

Embodiment 20

In Embodiment 16 or Embodiment 18,
when the signal intensity difference value does not exceed a predetermined range, the value indicating that a direction cannot be specified is determined as the first transmission direction.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Although the present disclosure was described above with reference to embodiments, the embodiments are only examples and do not limit the present disclosure, and those skilled in the art would know that the present disclosure may be changed and modified in various ways not exemplified above without departing from the scope of the present disclosure. For example, the components described in detail in the embodiments of the present disclosure may be modified. Further, differences relating to the changes and modifications should be construed as being included in the scope of the present disclosure which is determined by claims.

The present disclosure was described through examples that are applied to an autonomous driving system (Automated Vehicle & Highway Systems) on the basis of a 5G (5 generation) system, but the present disclosure may be applied to various wireless communication systems and autonomous driving systems.

According to an embodiment of the present disclosure, it is possible to efficiently control antennas of a vehicle.

Further, according to an embodiment of the present disclosure, it is possible to preferentially process a V2X message received in a danger expectation direction.

The effects of the present disclosure are not limited to the effects described above and other effects can be clearly understood by those skilled in the art from the following description.

What is claimed is:

1. A method of controlling a multi-antenna of a reception terminal in an autonomous driving system (Automated Vehicle & Highway Systems), the method comprising:
   acquiring directional information of the multi-antenna installed to receive a V2X message in the reception terminal;
   setting a danger expectation direction indicating the direction in which an object, which requires attention, is positioned, through first sensing information or map information;
   receiving the V2X message and determining a first transmission direction of the V2X message based on the directional information;
   en-queuing the V2X message to a queue mapped to the first transmission direction; and
   de-queuing the V2X message based on a preference value set in the queue,
   wherein the multi-antenna includes a first antenna and a second antenna directed in a direction symmetric to the first antenna, the first transmission direction is determined based on a signal intensity difference value of the V2X message received at the first antenna and the second antenna, and the preference value is based on the danger expectation direction.

2. The method of claim 1, further comprising:
   performing a control operation based on the V2X message;
   resetting the danger expectation direction through second sensing information or the map information; and
   resetting the preference value based on the reset danger expectation direction,
   wherein the control operation is based on a distance between the object and the reception terminal.

3. The method of claim 1, further comprising:
   determining a second transmission direction of the V2X message based on the directional information; and
   updating the first transmission direction based on the second transmission direction,
   wherein the determining of the second transmission direction is performed at every specific period and is based on the signal intensity difference value, and the updating of the first transmission direction is performed when the transmission direction exceeds an allowable range of the first transmission direction.

4. The method of claim 1, wherein the V2X message includes a source Layer-2 ID, and
   the first transmission direction is determined for each source Layer-2 ID.

5. The method of claim 1, wherein the first antenna is positioned on a front surface of the reception terminal and the second antenna is positioned on a rear surface of the reception terminal.

6. The method of claim 5, wherein the first transmission direction includes values that indicate a front direction, a rear direction, or that a direction cannot be specified with respect to the reception terminal.

7. The method of claim 5, wherein the multi-antenna includes a third antenna positioned on a left side of the reception terminal and a fourth antenna positioned on a right side of the reception terminal.

8. The method of claim 7, wherein the first transmission direction includes values that indicate a front direction, a rear direction, a left direction, a right direction, a front left direction, a front right direction, a rear left direction, a rear right direction, or that a direction cannot be specified with respect to the reception terminal.

9. The method of claim 8, wherein when the signal intensity difference value does not exceed a predetermined range, the value indicating that a direction cannot be specified is determined as the first transmission direction.

10. The method of claim 1, further comprising, when receiving location information of an RSU (Road side unit) transmitting a traffic light signal, setting the danger expectation direction based on the location information,
wherein the location information is acquired using the map information.

11. A reception terminal for a method of controlling a multi-antenna in an autonomous driving system (Automated Vehicle & Highway Systems), the reception terminal comprising:
a sensor;
a transceiver;
a reception (Rx) processor; and
a processor,
wherein the processor: acquires directional information of the multi-antenna installed to receive a V2X message in the reception terminal; sets a danger expectation direction indicating the direction in which an object, which requires attention, is positioned, through first sensing information or map information; receives the V2X message and determines a first transmission direction of the V2X message based on the directional information; en-queues the V2X message to a queue mapped to the first transmission direction; and de-queues the V2X message based on a preference value set in the queue; and
the multi-antenna includes a first antenna and a second antenna directed in a direction symmetric to the first antenna, the first transmission direction is determined based on a signal intensity difference value of the V2X message received at the first antenna and the second antenna, and the preference value is based on the danger expectation direction.

12. The reception terminal of claim 11, wherein the processor performs a control operation based on the V2X message, resets the danger expectation direction through second sensing information or the map information, and resets the preference value based on the reset danger expectation direction, and the control operation is based on a distance between the object and the reception terminal.

13. The reception terminal of claim 11, wherein the processor determines a second transmission direction of the V2X message based on the directional information and updates the first transmission direction based on the second transmission direction, through the reception processor; and
determining of the second transmission direction is performed at every specific period and is based on the signal intensity difference value, and updating of the first transmission direction is performed when the transmission direction exceeds an allowable range of the first transmission direction.

14. The reception terminal of claim 11, wherein the V2X message includes a source Layer-2 ID, and the first transmission direction is determined for each source Layer-2 ID.

15. The reception terminal of claim 11, wherein the first antenna is positioned on a front surface of the reception terminal and the second antenna is positioned on a rear surface of the reception terminal.

16. The reception terminal of claim 15, wherein the first transmission direction includes values that indicate a front direction, a rear direction, or that a direction cannot be specified with respect to the reception terminal.

17. The reception terminal of claim 15, wherein the multi-antenna includes a third antenna positioned on a left side of the reception terminal and a fourth antenna positioned on a right side of the reception terminal.

18. The reception terminal of claim 17, wherein the first transmission direction includes values that indicate a front direction, a rear direction, a left direction, a right direction, a front left direction, a front right direction, a rear left direction, a rear right direction, or that a direction cannot be specified with respect to the reception terminal.

19. The reception terminal of claim 11, wherein when receiving location information of an RSU (Road side unit) transmitting a traffic light signal, the processor sets the danger expectation direction based on the location information, and the location information is acquired using the map information.

* * * * *